United States Patent
Wheeler

(10) Patent No.: US 10,471,868 B2
(45) Date of Patent: Nov. 12, 2019

(54) LUMBAR SUPPORT SYSTEM FOR A VEHICLE SEAT ASSEMBLY

(71) Applicant: Kongsberg Automotive, Inc., Novi, MI (US)

(72) Inventor: Douglas J. Wheeler, Farmington Hills, MI (US)

(73) Assignee: Kongsberg Automotive, Inc., Novi, MI (US)

( * ) Notice: Subject to any disclaimer, the term of this patent is extended or adjusted under 35 U.S.C. 154(b) by 38 days.

(21) Appl. No.: 15/743,559

(22) PCT Filed: Jul. 11, 2016

(86) PCT No.: PCT/US2016/041754
§ 371 (c)(1),
(2) Date: Jan. 10, 2018

(87) PCT Pub. No.: WO2017/011391
PCT Pub. Date: Jan. 19, 2017

(65) Prior Publication Data
US 2018/0201168 A1 Jul. 19, 2018

Related U.S. Application Data

(60) Provisional application No. 62/191,165, filed on Jul. 10, 2015.

(51) Int. Cl.
*B60N 2/66* (2006.01)
*B60N 2/02* (2006.01)

(52) U.S. Cl.
CPC ........... *B60N 2/665* (2015.04); *B60N 2/0228* (2013.01)

(58) Field of Classification Search
CPC ............................. B60N 2/665; B60N 2/0228
(Continued)

(56) References Cited

U.S. PATENT DOCUMENTS

| | | | | |
|---|---|---|---|---|
| 3,661,422 A | * | 5/1972 | Sember | A47C 7/407 137/881 |
| 4,491,157 A | * | 1/1985 | Hashimoto | A47C 4/54 137/871 |

(Continued)

FOREIGN PATENT DOCUMENTS

| CN | CN 201771732 U | 3/2011 |
|---|---|---|
| DE | 41 06 862 A1 | 9/1992 |

(Continued)

OTHER PUBLICATIONS

International Search Report for International Patent Publication No. PCT/US2016/041754 completed on Oct. 7, 2016; 4 pages.

(Continued)

*Primary Examiner* — Syed A Islam
(74) *Attorney, Agent, or Firm* — Howard & Howard Attorneys PLLC

(57) ABSTRACT

One embodiment of a lumbar support system includes one or more air cells adapted to be mounted to a vehicle seat assembly, a pump selectively inflating the air cells, and a valve fluidly connected between the pump and the air cells. The valve includes a body defining a pair of cavities corresponding with each of the air cells. The valve further includes an inflate plunger movable in one of the cavities to selectively open the cavity and a deflate plunger movable in the other cavity to selectively open the other cavity. Furthermore, the valve includes an actuator movably coupled to the body between a first operational position to inflate the air cell, and a second operational position to deflate the air cell. An electrical switch is electrically coupled to an electrical input of the pump and closed when the actuator is moved to the first or second operational positions.

20 Claims, 19 Drawing Sheets

(58) Field of Classification Search
USPC ............................ 297/284.6; 251/304–317.01
See application file for complete search history.

(56) References Cited

U.S. PATENT DOCUMENTS

| | | | | |
|---|---|---|---|---|
| 4,491,364 | A * | 1/1985 | Hattori | B60N 2/66 297/284.6 |
| 4,570,676 | A * | 2/1986 | Nishio | A47C 7/467 137/870 |
| 4,592,588 | A * | 6/1986 | Isono | A47C 7/467 297/284.6 |
| 4,633,763 | A * | 1/1987 | Manning | A47C 7/467 91/530 |
| 4,655,505 | A * | 4/1987 | Kashiwamura | A47C 7/467 297/284.6 |
| 5,570,716 | A * | 11/1996 | Kamen | B60N 2/4415 137/223 |
| 5,573,034 | A | 11/1996 | Gabrlik et al. | |
| 5,668,357 | A * | 9/1997 | Takiguchi | B60N 2/0228 200/302.1 |
| 5,860,699 | A | 1/1999 | Weeks | |
| 5,983,940 | A * | 11/1999 | Smith | F16K 5/0442 137/625.22 |
| 6,014,784 | A * | 1/2000 | Taylor | A61G 7/05776 297/284.6 |
| 6,098,000 | A * | 8/2000 | Long | A47C 4/54 701/49 |
| 6,203,105 | B1 * | 3/2001 | Rhodes, Jr. | A47C 4/54 297/284.6 |
| 6,299,250 | B1 * | 10/2001 | Orizaris | B60N 2/0228 297/284.6 |
| 6,517,500 | B2 * | 2/2003 | Ichikawa | A61H 7/001 601/101 |
| 6,597,345 | B2 * | 7/2003 | Hirshberg | G06F 3/0234 341/22 |
| 6,895,988 | B2 * | 5/2005 | Grant | G05D 7/0664 137/119.01 |
| 6,916,300 | B2 * | 7/2005 | Hester | A61H 23/04 297/284.6 |
| 8,678,500 | B2 | 3/2014 | Lem et al. | |
| 8,784,080 | B2 | 7/2014 | Dörfler et al. | |
| 8,794,707 | B2 * | 8/2014 | Bocsanyi | B60N 2/914 297/452.41 |
| 8,835,780 | B2 * | 9/2014 | Salagean | B60N 2/0228 200/5 A |
| 9,358,909 | B2 | 6/2016 | Jeong et al. | |
| 9,505,322 | B2 | 11/2016 | Hosbach et al. | |
| 9,545,860 | B2 | 1/2017 | Bocsanyi | |
| 2005/0067868 | A1 * | 3/2005 | Kern | F16K 11/0716 297/284.6 |
| 2006/0217643 | A1 * | 9/2006 | Yonekawa | A61H 9/0078 601/148 |
| 2010/0193340 | A1 * | 8/2010 | Ujimoto | B60N 2/0228 200/339 |
| 2010/0264006 | A1 * | 10/2010 | Salagean | B60N 2/0228 200/5 A |
| 2014/0232155 | A1 * | 8/2014 | Bocsanyi | A47C 4/54 297/284.6 |
| 2015/0115678 | A1 * | 4/2015 | Hosbach | A47C 7/467 297/284.6 |
| 2015/0251573 | A1 * | 9/2015 | Misch | B60N 2/665 297/452.41 |
| 2015/0321587 | A1 * | 11/2015 | Shigematsu | B60N 2/995 297/330 |
| 2016/0185263 | A1 | 6/2016 | Uno et al. | |
| 2016/0280097 | A1 * | 9/2016 | Hotary | B60N 2/0244 |
| 2018/0111507 | A1 * | 4/2018 | Nakamura | B60N 2/0228 |

FOREIGN PATENT DOCUMENTS

| | | |
|---|---|---|
| DE | 198 57 900 C1 | 6/2000 |
| DE | 100 63 478 A1 | 7/2002 |
| DE | 10 2007 020507 A1 | 11/2008 |
| DE | 10 2011 107677 A1 | 1/2013 |
| EP | 2 607 181 A1 | 6/2013 |
| EP | 3 124 320 A1 | 2/2017 |
| FR | 3 034 726 A1 | 10/2016 |
| JP | S60 45438 A | 3/1985 |
| JP | 2016 172487 A | 9/2016 |
| KR | 2002 0046511 A | 6/2002 |
| KR | 10 1039349 B1 | 6/2011 |
| KR | 10 1075003 B1 | 10/2011 |
| KR | 20 0459755 Y1 | 4/2012 |
| WO | WO 2012 159689 A1 | 11/2012 |

OTHER PUBLICATIONS

English language abstract, and machine-assisted English language translation for Japanese Patent Publication No. JP S60 45438 A extracted from www.espacenet.com on Dec. 27, 2017; 5 pages.

English language abstract, and machine-assisted English language translation of Chinese Publication No. CN 201771732 U extracted from www.espacenet.com on Jan. 31, 2018; 5 pages.

English language abstract, and machine-assisted English language translation of German Publication No. DE 100 63 478 A1 extracted from www.espacenet.com on Jan. 31, 2018; 5 pages.

English language abstract, and machine-assisted English language translation of German Publication No. DE 10 2007 020507 A1 extracted from www.espacenet.com on Jan. 31, 2018; 7 pages.

English language abstract, and machine-assisted English language translation of German Publication No. DE 10 2011 107677 A1 extracted from www.espacenet.com on Jan. 31, 2018; 5 pages.

English language abstract, and machine-assisted English language translation of German Publication No. DE 198 57 900 C1 extracted from www.espacenet.com on Jan. 31, 2018; 8 pages.

English language abstract, and machine-assisted English language translation of German Publication No. DE 41 06 862 A1 extracted from www.espacenet.com on Jan. 31, 2018; 6 pages.

Machine-assisted English language translation of French Publication No. FR 3 034 726 A1 extracted from www.espacenet.com on Jan. 31, 2018; 8 pages.

English language abstract, and machine-assisted English language translation of Japanese Publication No. JP 2016 172487 A extracted from www.espacenet.com on Jan. 31, 2018; 7 pages.

English language abstract, and machine-assisted English language translation of Japanese Publication No. JP S60 45438 A extracted from www.espacenet.com on Jan. 31, 2018; 5 pages.

English language abstract, and machine-assisted English language translation of Korean Publication No. KR 10 1039349 B1 extracted from www.espacenet.com on Feb. 1, 2018; 9 pages.

English language abstract, and machine-assisted English language translation of Korean Publication No. KR 2011 0056978 A, which is an equivalent publication of KR 10 1075003 B1 extracted from www.espacenet.com on Feb. 1, 2018; 9 pages.

English language abstract only of Korean Publication No. KR 2002 0046511 A extracted from www.espacenet.com on Feb. 1, 2018; 1 pages.

English language abstract, and machine-assisted English language translation of International Publication No. WO 2012 159689 A1 extracted from www.espacenet.com on Jan. 31, 2018; 9 pages.

* cited by examiner

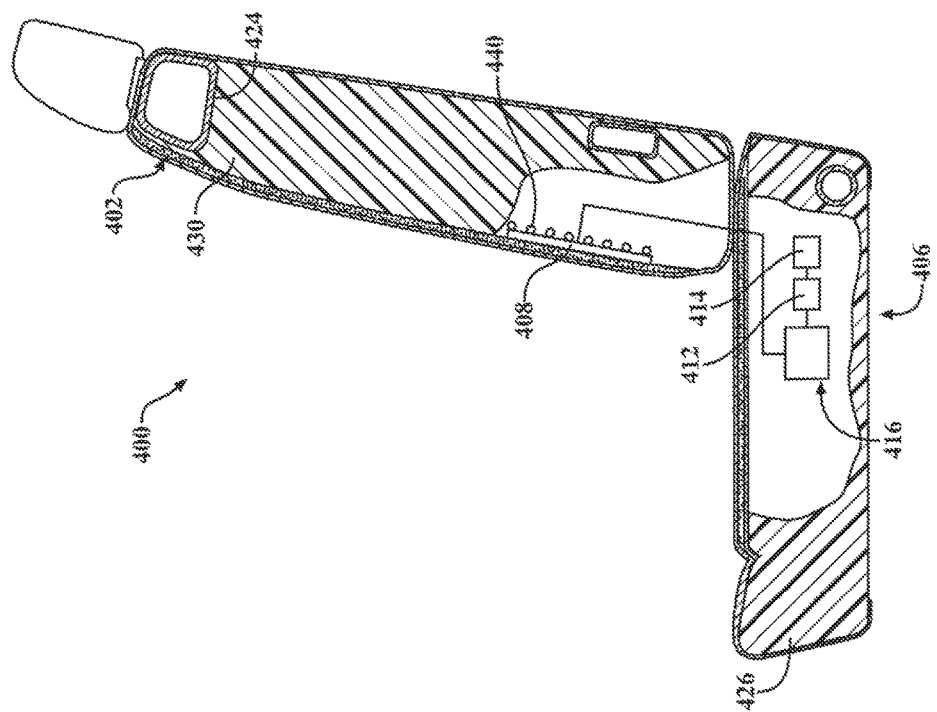
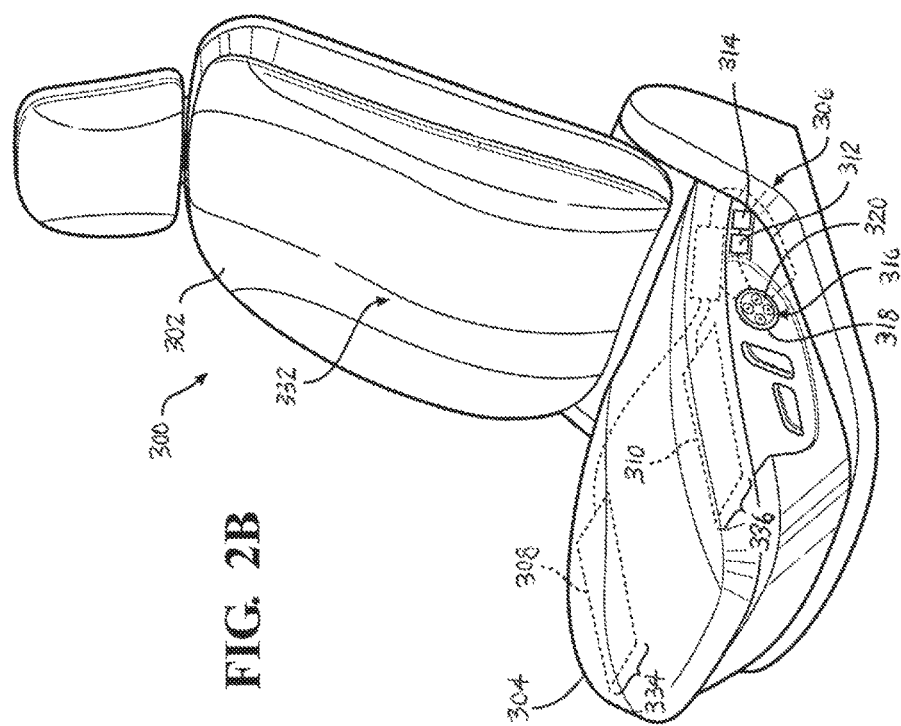

LUMBAR SUPPORT SYSTEM FOR A VEHICLE SEAT ASSEMBLY

RELATED APPLICATIONS

This application is the National Stage of International Patent Application No. PCT/US2016/041754, filed Jul. 11, 2016, which claims priority to and the benefit of U.S. Provisional Patent Application No. 62/191,165, filed on Jul. 10, 2015, the entire contents of which are hereby incorporated by reference.

CROSS REFERENCE TO RELATED APPLICATION

This application claims the benefit of U.S. Provisional Patent Application Ser. No. 62/191,165 filed Jul. 10, 2015, herein incorporated in its entirety.

TECHNICAL FIELD

The subject invention relates generally to a vehicle seat assembly having a lumbar support system that includes one or more air cells and a simple, low cost valve inflating and deflating the air cells.

SUMMARY OF THE DISCLOSURE

One example of the present invention provides a lumbar support system including one or more air cells adapted to be mounted to a vehicle seat assembly. The system further includes a pump fluidly connected to the air cells to selectively inflate the air cells, and the pump has an electrical input. In addition, the system also includes a valve, which is fluidly connected between the pump and the air cells and has a body defining a pair of cavities corresponding with each air cell. The valve also includes an inflate plunger movable in one of the cavities to selectively open the cavity and a deflate plunger movable in the other cavity to selectively open the other cavity. The valve further includes an actuator movably coupled to the body between a first operational position to move the inflate plunger to open the cavity such that the pump fluidly communicates with the air cells to inflate the corresponding air cells, and a second operational position to move the deflate plunger to open the other cavity such that the air cells fluidly communicate with the atmosphere to deflate the corresponding air cells. The valve further includes an electrical switch electrically coupled to the electrical input of the pump and closed when the actuator is moved to any one of the first or second operational positions.

BRIEF DESCRIPTION OF THE DRAWINGS

Advantages of the present invention will be readily appreciated as the same becomes better understood by reference to the following detailed description when considered in connection with the accompanying drawings.

FIG. 2B is a cross-sectional view of another embodiment of a vehicle seat assembly.

FIG. 2C is a cross-sectional view of still another embodiment of a vehicle seat assembly.

DETAILED DESCRIPTION

Referring to the Figures, like numerals indicate like or corresponding parts throughout the several views of a vehicle seat assembly 100, which includes a seat back 102, a seat bottom 104, and a lumbar support system 106 coupled to the seat back 102 or the seat bottom 104 to provide adjustable support for a passenger.

Figure 1:
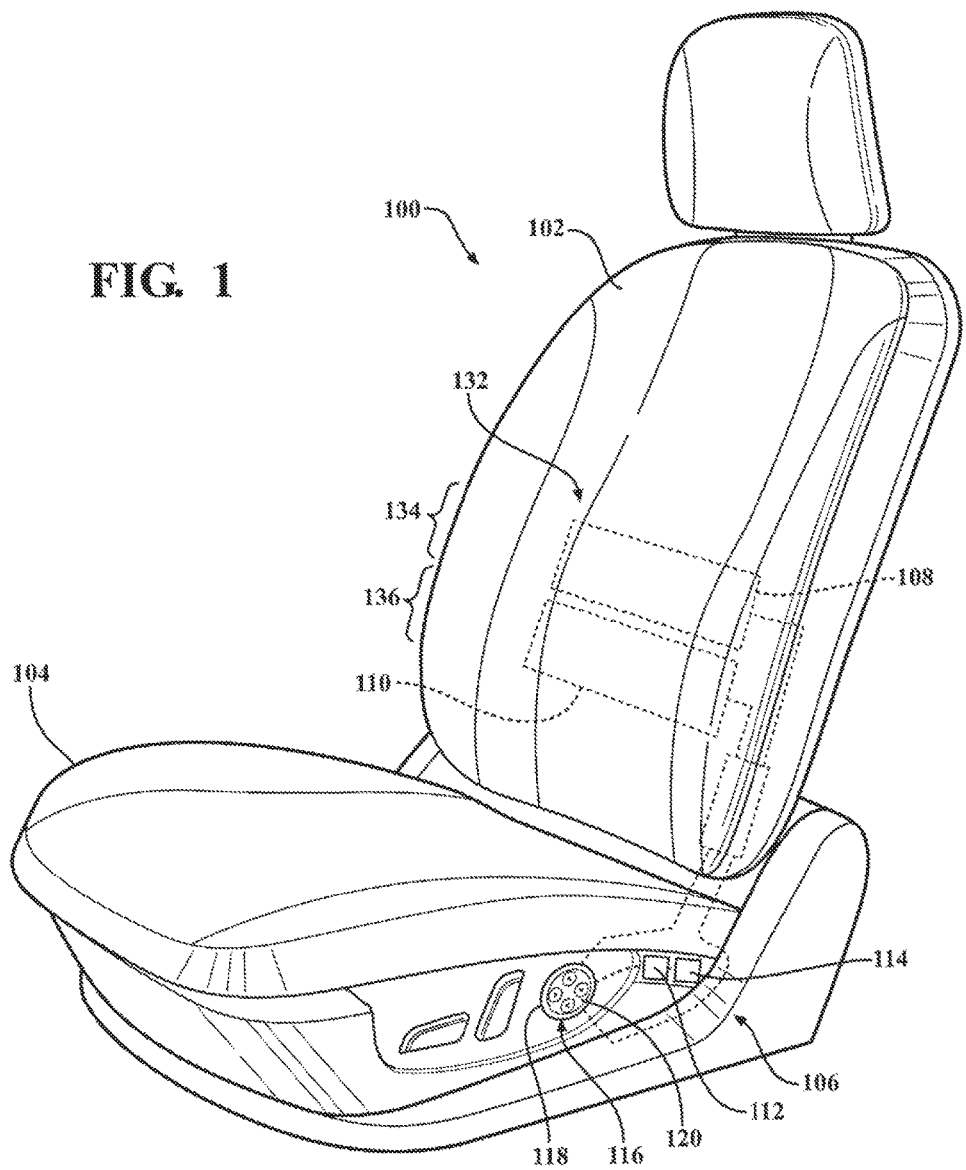
FIG. 1 is a perspective view of a first embodiment of a vehicle seat assembly having a seat bottom, a seat back coupled to the seat bottom, and a lumbar support system coupled to the seat back and the seat bottom.

Referring to FIG. 1, the lumbar support system 106 includes one or more air cells 108, 110 adapted to be mounted to the seat back 102, a pump 112 fluidly connected to the air cells 108, 110 to selectively inflate the same, and an electrical input 114 for the pump 112. The lumbar support system 106 further includes a valve 116 fluidly connected between the pump 112 and the air cells 108, 110. The valve 116 includes a body 118 and an actuator 120 movably coupled to the body 118 between a neutral position and a plurality of operational positions to adjust the air cells 108, 110. In this example, the actuator 120 is movable between the neutral position and the first, second, third, and fourth operational positions to simultaneously inflate air cells 108, 110, simultaneously deflate the air cells 108, 110, or inflate one of the air cells while deflating the other. Furthermore, the valve 116 also includes an electrical switch 122 (FIG. 27) electrically connecting the electrical input 114 to the pump 112 to actuate the pump 112 when the actuator 120 is moved to any one of the operational positions corresponding with inflating at least one of the air cells 108, 110. In other embodiments, the lumbar support system can have more or fewer than two air cells coupled to any portion of the vehicle seat. Furthermore, the actuator can move to more or fewer than four operational positions to inflate or deflate one air cell at a time or any number of air cells simultaneously.

Figure 2A:
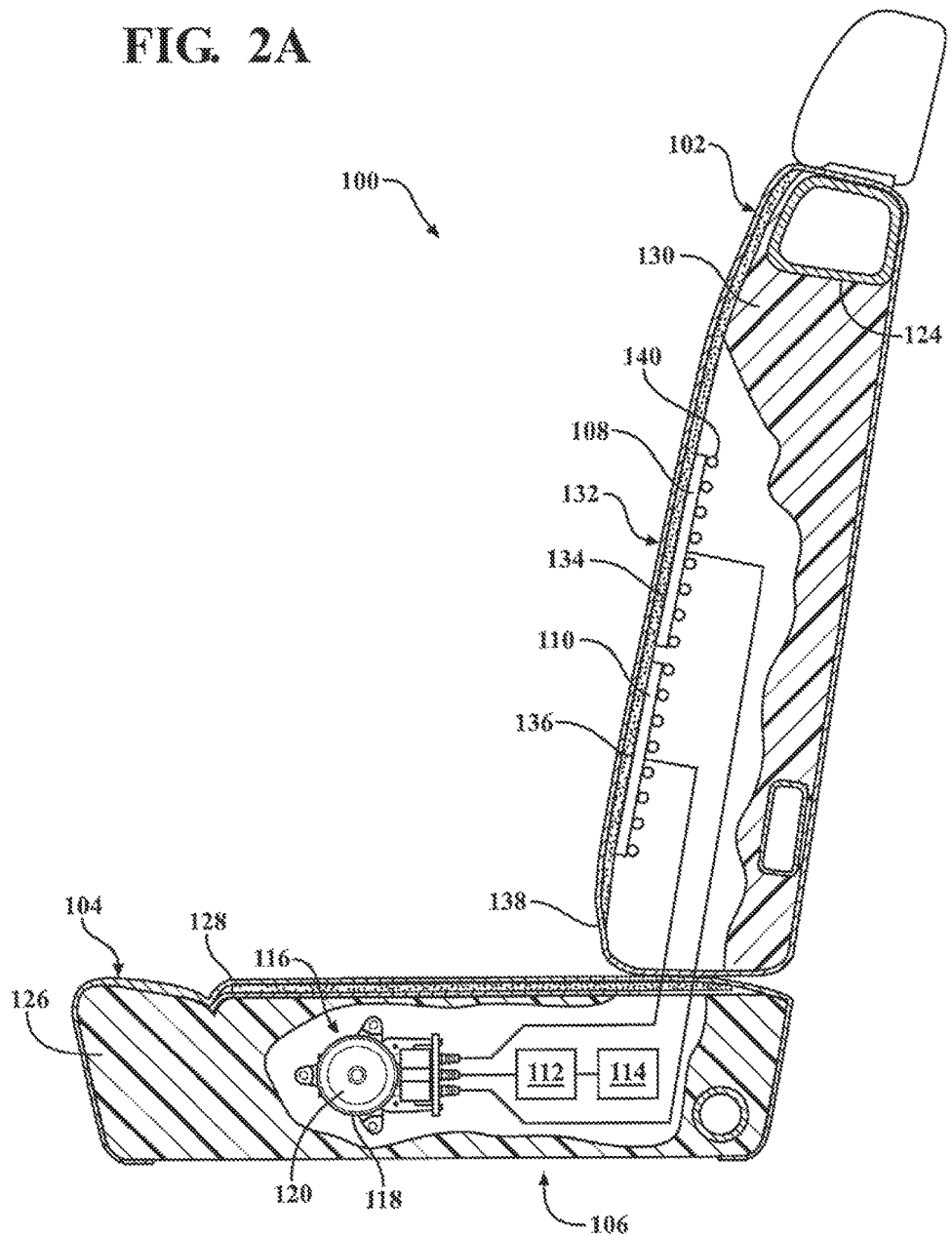
FIG. 2A is a cross-sectional view of the vehicle seat assembly of FIG. 1A, illustrating the lumbar support system having two air cells, a pump, and a valve fluidly connected between the pump and the air cells.

Referring to FIG. 2A, the vehicle seat assembly 100 includes a frame 124 and a seat bottom 104 having a bottom cushion 126 coupled to the frame 124. In this embodiment, the bottom cushion 126 is a foam padding. However, the bottom cushion 126 can be comprised of any suitable material. The seat bottom 104 further comprises a seat cover 128 or Class A surface, which is comprised of a layer of flexible material that surrounds the bottom cushion 126.

The vehicle seat assembly 100 further includes a seat back 102 having a back cushion 130 coupled to the frame 124. The back cushion 130 can have a lumbar region 132, which includes an upper portion 134 for supporting an upper back of a person and a lower portion 136 below the upper portion 134 for supporting a lower back of the person. The back cushion 130 can be comprised of foam padding. However, the back cushion can be comprised of any suitable material. The seat back 102 further includes a seat cover 138 or Class A surface, which is comprised of a layer of flexible material that surrounds the back cushion 130.

The vehicle seat assembly 100 further includes the lumbar support system 106, which has one or more air cells adapted to be mounted to the seat back 102, the seat bottom 104, or both of the seat back 102 and the seat bottom 104. In this embodiment, the lumbar support system 106 includes a sub-frame 140, and an upper air cell 108 coupled to the sub-frame 140, such that the upper air cell 108 is disposed in the upper portion 134 of the lumbar region 132. The lumbar support system 106 further includes a lower air cell 110 coupled to the sub-frame 140, such that the lower air cell 110 is disposed in the lower portion 136 of the lumbar region 132. It is contemplated that the lumbar support system can include any number of air cells adapted to be mounted to any portion of the seat back or the seat back.

Referring to FIG. 2B, another embodiment of a vehicle seat assembly 300 is similar to the vehicle seat assembly 100 of FIG. 2A and includes the same or similar components identified by the same reference numbers increased by 200. However, while the assembly 100 of FIG. 2A includes the upper and lower air cells 108, 110 coupled to the seat back 102, the assembly 300 includes only a pair of air cells 308, 310 coupled to a corresponding one of two bolsters 305, 305b of the seat bottom 304.

Referring to FIG. 2C, still another embodiment of a vehicle seat assembly 400 is similar to the vehicle seat assembly 100 of FIG. 2A and includes the same or similar components identified by the same reference numbers increased by 300. However, while the assembly 100 of FIG. 2A includes the upper and lower air cells 108, 110 coupled to the seat back 102, the assembly 400 includes only one air cell 408 coupled to the seat back 402.

Figure 3A:
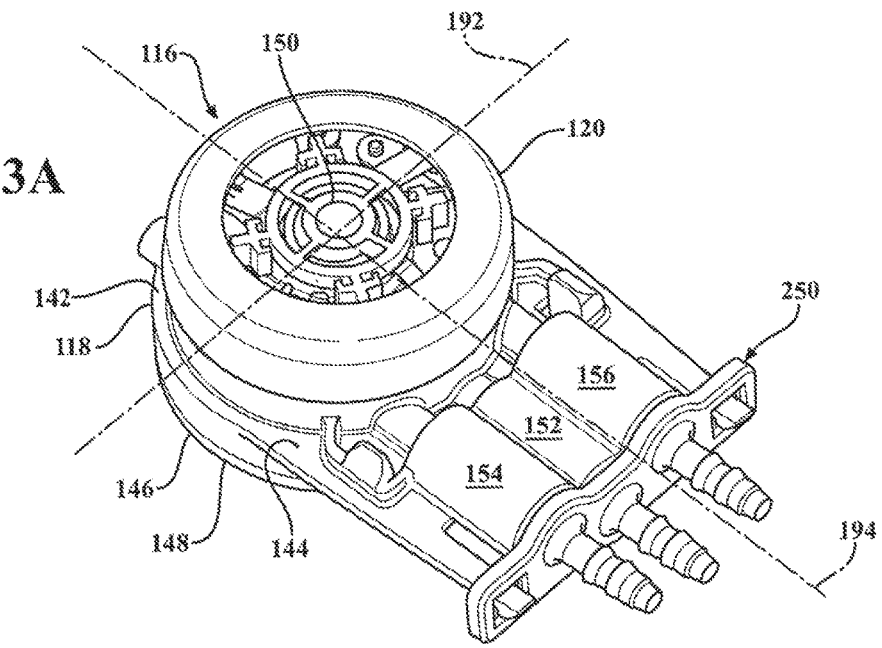
FIG. 3A is a perspective view of the valve of FIG. 2A, illustrating the valve having a body, an actuator movable coupled to the body, and top and bottom plates coupled to opposing sides of the body.
Figure 15:
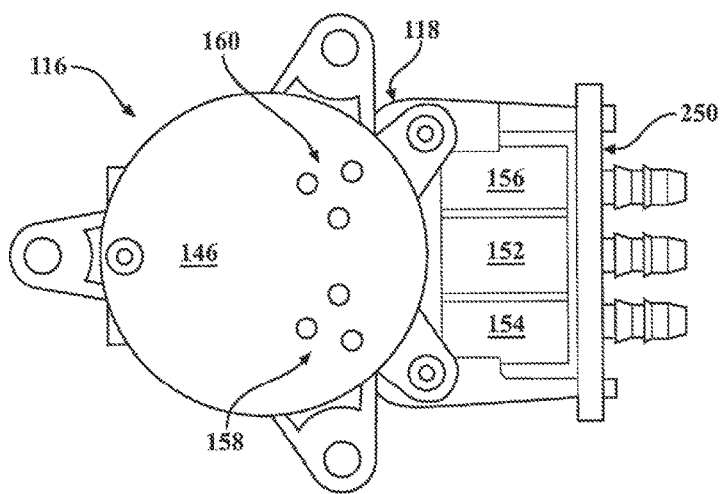
FIG. 15 is another side view of the valve of FIG. 3B, illustrating the back plate defining a pair of exhaust ports.

Referring to FIG. 3A, the lumbar support system 106 includes the valve 116, which has a body 118, a top plate 142 coupled to one side 144 of the body 118, and a bottom plate 146 coupled to an opposing side 148 of the body 118. The body 118 includes a center portion 150 and supply port 152 disposed about the center region and fluidly connected to the pump 112 to receive a flow of air from the pump 112. The body 118 further includes an upper air cell port 154 disposed about the center portion 150 and fluidly connected to the upper air cell 108 to selectively inflate or deflate the upper air cell 108. The body 118 further includes a lower air cell port 156 disposed about the center portion 150 and fluidly connected to the lower air cell 110 to selectively inflate or deflate the lower air cell 110. As shown in FIG. 15, the bottom plate 146 defines two exhaust ports 158, 160 fluidly connecting the air cells 108, 110 with the atmosphere to exhaust air from the air cells 108, 110 to deflate those air cells 108, 110. Furthermore, the bottom plate 146 is coupled to the body 118 define a plurality of cavities fluidly communicating with the supply port 152, the upper air cell port 154, the lower air cell port 156, and the exhaust ports 158, 160, as will be described in detail below with reference to FIGS. 3B through 13.

Figure 3B:
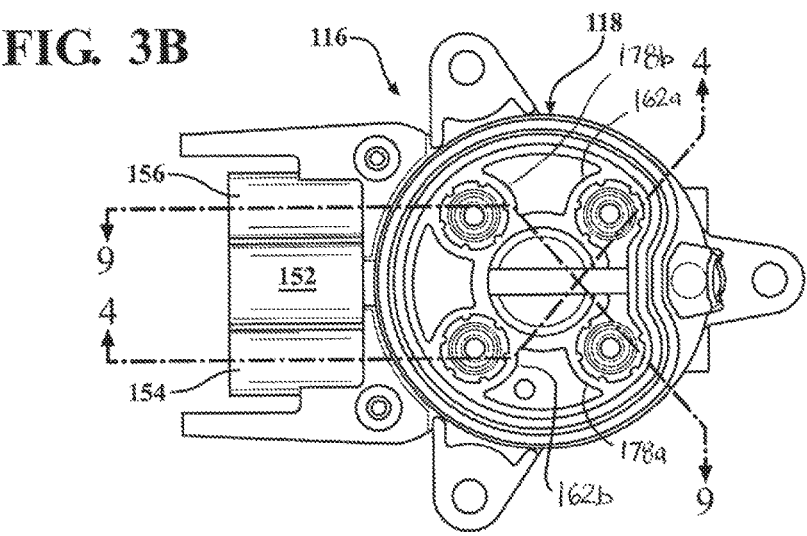
FIG. 3B is a side view of a portion of the valve of FIG. 3A, with the bottom plate removed to illustrate the body having cavities and plungers movable therein.
Figure 4:
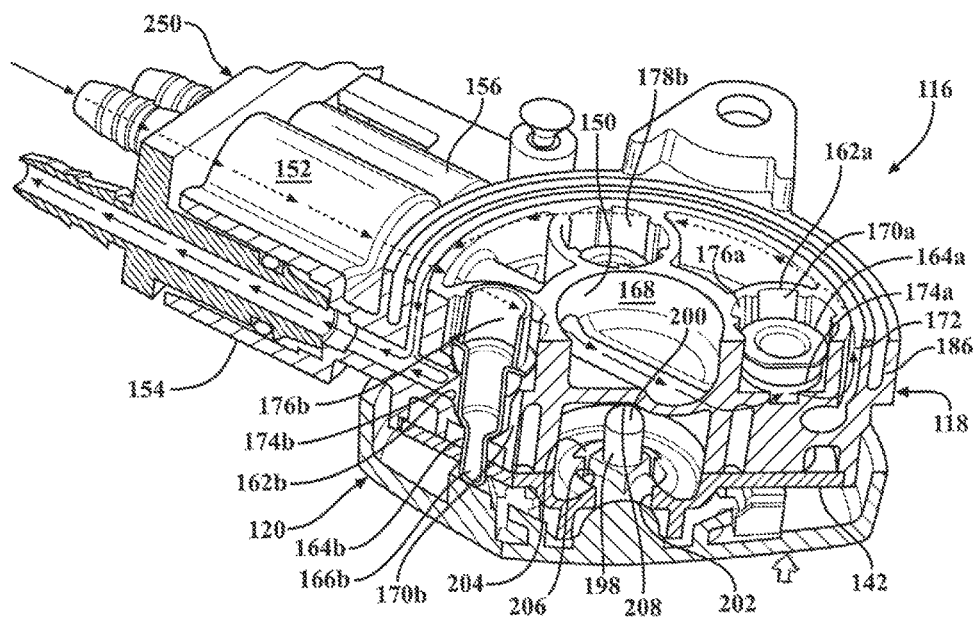
FIG. 4 is a perspective cross-sectional view of the valve of FIG. 3B, as taken along line 4-4, illustrating an inflate plunger being opened and a deflate plunger remaining closed to inflate the corresponding upper air cell.
Figure 5:
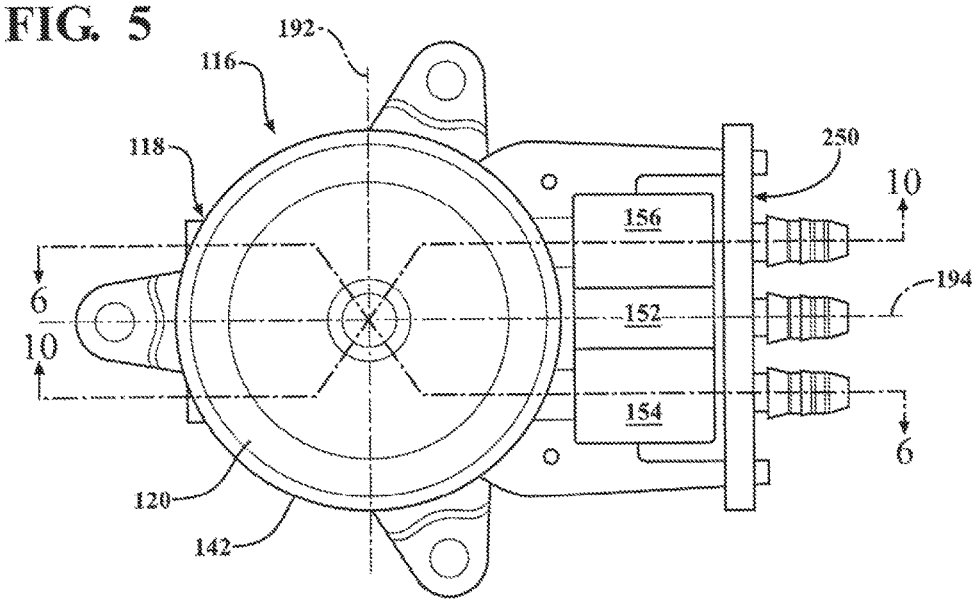
FIG. 5 is a side view of the valve of FIG. 3B.

FIG. 3B illustrates a back plan view of a portion of the valve 116 of FIG. 3A, with the bottom plate 146 removed to generally illustrate the body 118 having one pair of cavities corresponding with each air cell and disposed on opposing sides of the center portion 150.

Figure 6:
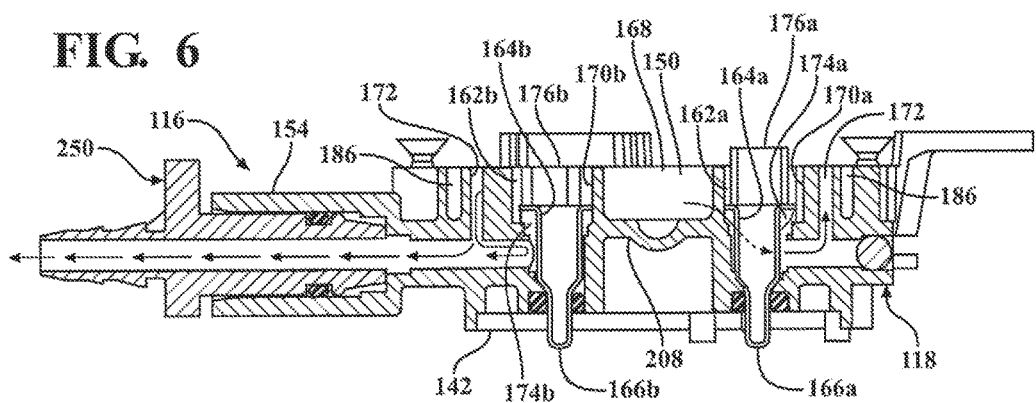
FIG. 6 is a cross-sectional view of the valve of FIG. 5, as taken along line 6-6, illustrating an inflate plunger being opened and a deflate plunger remaining closed to inflate the corresponding upper air cell.
Figure 7:
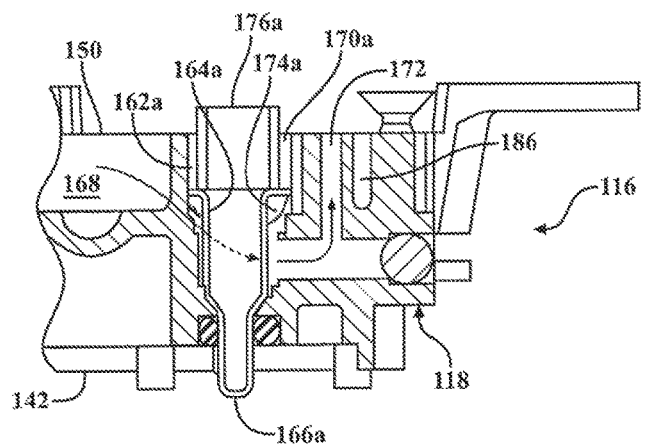
FIG. 7 is an enlarged view of a portion of the valve having the inflate plunger shown in FIG. 5.
Figure 8:
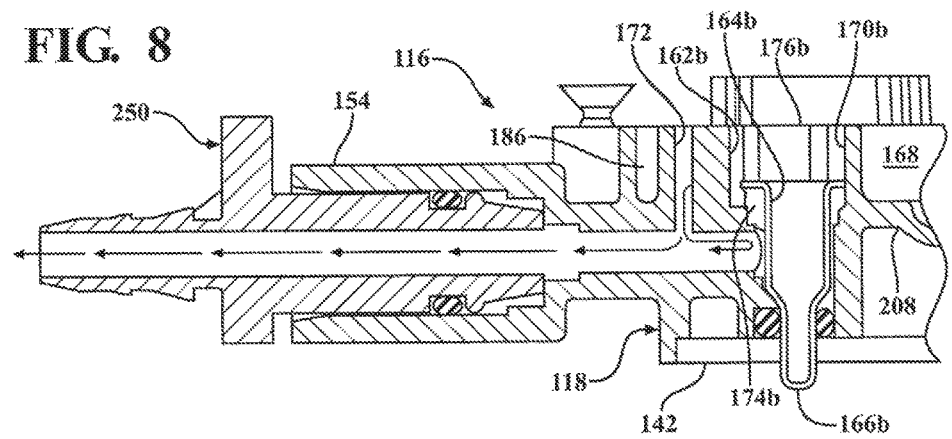
FIG. 8 is an enlarged view of a portion of the valve having the deflate plunger shown in FIG. 5.
Figure 9:
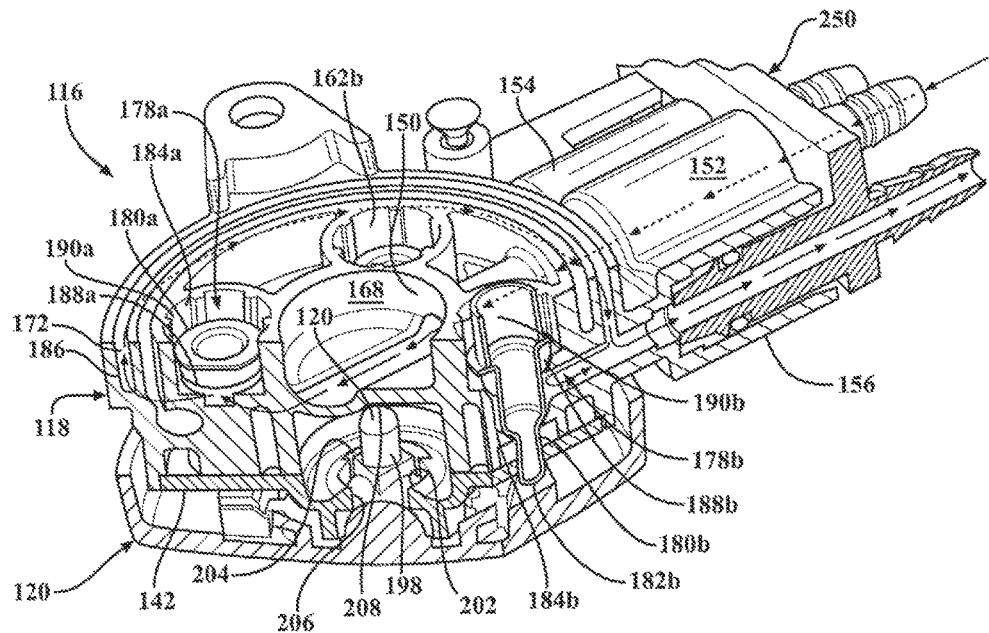
FIG. 9 is a perspective cross-sectional view of the valve of FIG. 3B, as taken along line 9-9, illustrating an inflate plunger being opened and a deflate plunger remaining closed to inflate the corresponding lower air cell.

Referring to FIGS. 4 through 8, the body 118 includes a pair of cavities 162a, 162b corresponding with the upper air cell 108 and disposed on opposing sides of the center portion 150. The cavity 162a is fluidly connected between the supply port 152 and the upper air cell port 154, and the valve 116 includes an inflate plunger 164a movable in the cavity 162a to selectively open the cavity 162a, such that air can flow from the supply port 152 to the upper air cell port 154 to inflate the upper air cell 108. As best shown in FIG. 6, the inflate plunger 164a terminates at a tip 166a, which is contacted by the actuator in the first or third operational position to move the inflate plunger 164a and open the cavity 162a. More specifically, in this embodiment, the body 118 includes a center chamber 168 fluidly communicating with the supply port 152 to receive air from the supply port 152. In this example, the cavity 162a includes a cylinder 170a fluidly communicating with the center chamber 168 to receive air from the center chamber 168 and having the inflate plunger 164a movable therein. The cavity 162a can further include an annular channel 172 fluidly communicating with the cylinder 170a to receive air from the cylinder 170a. The upper air cell port 154 fluidly communicates with the annular channel 172 to receive air from the cavity 162a when the inflate plunger 164a is moved to selectively open the cavity 162a. As will be described in detail with reference to FIGS. 16 through 18, a person can move the actuator 120 to the first or third operational positions to move the inflate plunger 164a and open the cavity 162a, such that the valve 116 fluidly connects the pump 112 and the upper air cell 108 to one another to inflate the upper air cell 108.

The body 118 further includes a seal 174a in the cylinder 170a, and the valve 116 includes a spring 176a moving the inflate plunger 164a to abut the seal 174a against the body 118 and close the cavity 162a when the actuator 120 is in the neutral position between any of the operational positions.

Figure 13:
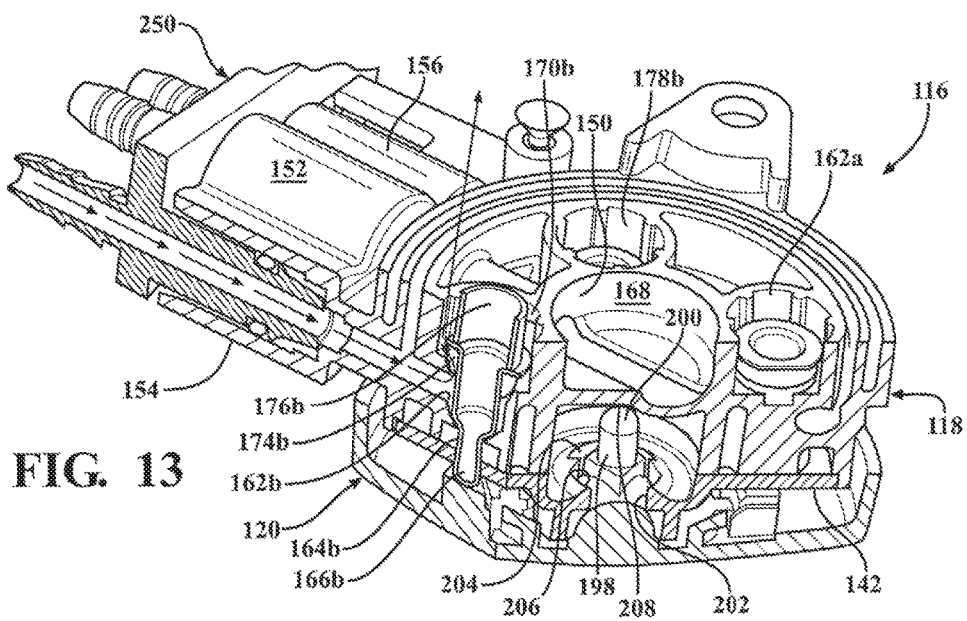
FIG. 13 is a perspective cross-sectional view of the valve of FIG. 3B, illustrating a deflate plunger being opened and an inflate plunger remaining closed to deflate the corresponding upper air cell.

Referring to FIG. 13, the cavity 162b is fluidly connected between the upper air cell port 154 and the exhaust port 158 (FIG. 15), and the valve 116 includes a deflate plunger 164b movable in the cavity 162b to selectively open the cavity 162b, such that air can flow from the upper air cell port 154 to the exhaust port 158 to deflate the upper air cell 108. The deflate plunger 164b terminates at a tip 166b, which is contacted by the actuator in the second or fourth operational positions to move the deflate plunger 164b and open the cavity 162b. More specifically, in this embodiment, the cavity 162b includes a cylinder 170b fluidly communicating with the upper air cell port 154 to receive air from the upper air cell port 154 and having the deflate plunger 164b movable therein. The exhaust port 158 fluidly communicates with the cavity 162b to exhaust air from the cylinder 170b into the atmosphere. As will be described in detail with reference to FIGS. 16 through 18, a person can move the actuator 120 to the second or fourth operational positions to move the deflate plunger 164b and open the cavity 162b, such that the valve 116 fluidly connects the upper air cell 108 to the atmosphere to deflate the upper air cell 108.

The body 118 further includes a seal 174b in the cylinder 170b, and the valve 116 includes a spring 176b moving the deflate plunger 164b to abut the seal 174b against the body 118 to close the cavity 162b when the actuator 120 is in the neutral position between any of the operational positions.

Referring to FIGS. 9 through 12, the body 118 further includes a pair of cavities 178a, 178b corresponding with the lower air cell 110 and disposed on opposing sides of the center portion 150. The cavities 178a, 178b corresponding with the lower air cell 110 can be angularly offset about the center portion 150 from the pair of cavities 162a, 162b corresponding with the upper air cell 108. In this example, each one of the cavities 162a, 162b, 178a, 178b corresponding with the upper and lower air cells 108, 110 are angularly offset from one another about the center portion 150 by 90 degrees.

The cavity 178a is fluidly connected between the supply port 152 and the lower air cell port 156, and the valve 116 includes an inflate plunger 180a movable in the cavity 178a to selectively open the cavity 178a, such that air can flow from the supply port 152 to the lower air cell port 156 to inflate the lower air cell 110. The inflate plunger 180a terminates at a tip 182a, which is contacted by the actuator in the first or fourth operational positions to move the inflate plunger 180a and open the cavity 178a. More specifically, similar to the cavity 162a, the cavity 178a includes a cylinder 184a fluidly communicating with the center chamber 168 to receive air from the center chamber 168 and having the inflate plunger 180a movable therein. The cavity 178a further includes an annular channel 186 fluidly communicating with the cylinder 184a to receive air from the cylinder 184a. The lower air cell port 156 fluidly communicates with the annular channel 186 to receive air from the cavity 178a when the inflate plunger 180a is moved to selectively open the cavity 178a. As will be described in detail with reference to FIGS. 16 through 18, a person can move the actuator 120 to the first or fourth operational positions to move the inflate plunger 180a and open the cavity 178a, such that the valve 116 fluidly connects the pump 112 and the lower air cell 110 to one another to inflate the lower air cell 110.

The body 118 further includes a seal 188a in the cylinder 184a, and the valve 116 includes a spring 190a moving the inflate plunger 180a to abut the seal 188a against the body 118 to close the cavity 178a when the actuator 120 is in the neutral position between any of the operational positions.

Figure 14:
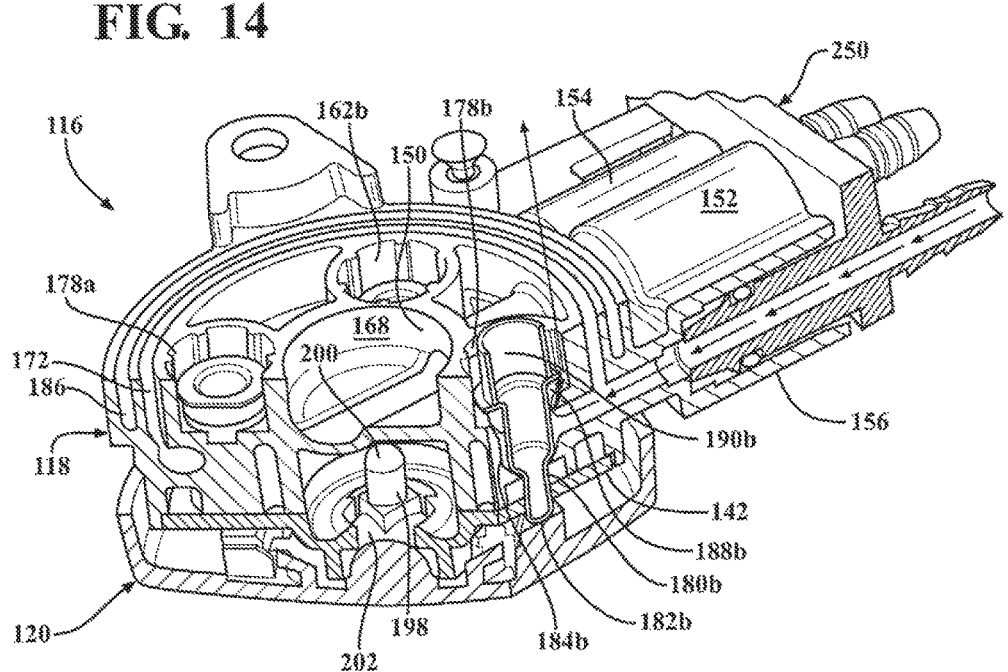
FIG. 14 is a perspective cross-sectional view of the valve of FIG. 3B, illustrating a deflate plunger being opened and an inflate plunger remaining closed to deflate the corresponding lower air cell.

Referring to FIG. 14, the cavity 178b is fluidly connected between the lower air cell port 156 and the exhaust port 160 (FIG. 15), and the valve 116 includes a deflate plunger 180b movable in the cavity 178b to selectively open the cavity 178b, such that air can flow from the lower air cell port 156 to the exhaust port 160 to deflate the lower air cell 110. The deflate plunger 180b terminates at a tip 182b, which is contacted by the actuator in the second or third operational positions to move the deflate plunger 180b and open the cavity 178b. In this embodiment, the cavity 178b includes a cylinder 184b fluidly communicating with the upper air cell port 154 to receive air from the upper air cell port 154 and having the deflate plunger 180b movable therein. The exhaust port 160 fluidly communicates with the cavity 178b to exhaust air from the cylinder 184b into the atmosphere. As will be described in detail with reference to FIGS. 16 through 18, a person can move the actuator 120 to the second or third operational positions to move the deflate plunger 180b and open the cavity 178b, such that the valve 116 fluidly connects the lower air cell 110 to the atmosphere to deflate the lower air cell 110.

The body 118 further includes a seal 188b in the cylinder 184b, and the valve 116 includes a spring 190b moving the deflate plunger 180b to abut the seal 188b against the body 118 to close the cavity 178b when the actuator 120 is in the neutral position between any of the operational positions.

Figure 16:
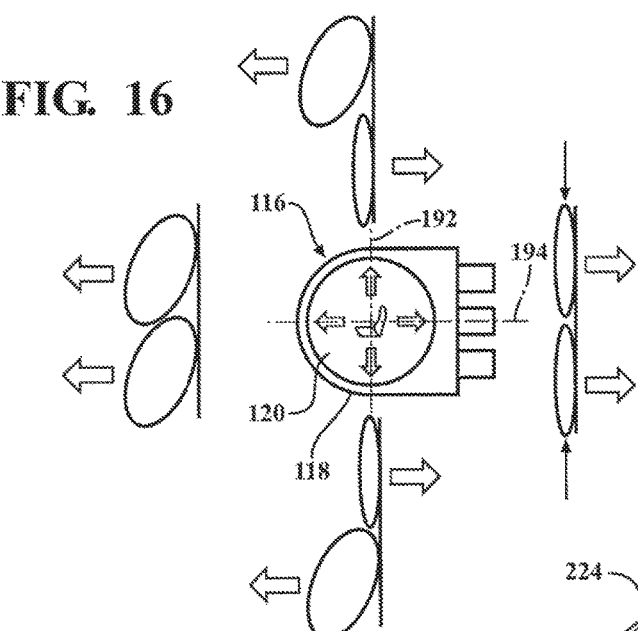
FIG. 16 is a schematic diagram of the valve of FIG. 2A, illustrating the valve having an actuator moved to four operational positions for simultaneously inflating or deflating the upper and lower air cells.
Figure 17A:
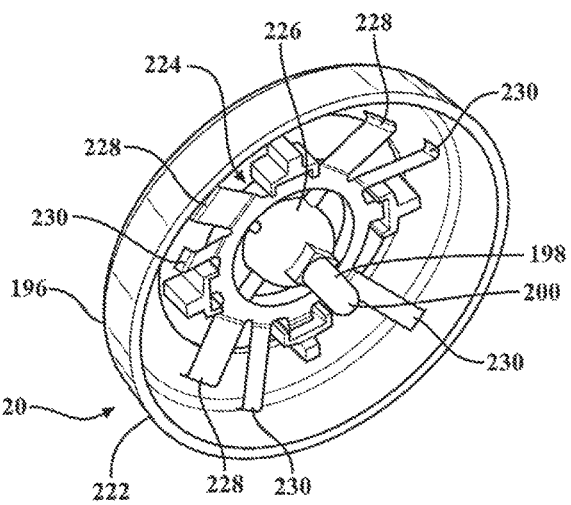
FIG. 17A is a bottom perspective view of the actuator of FIG. 3A, illustrating the actuator having a leaf spring of an electrical switch coupled to the actuator.
Figure 17B:
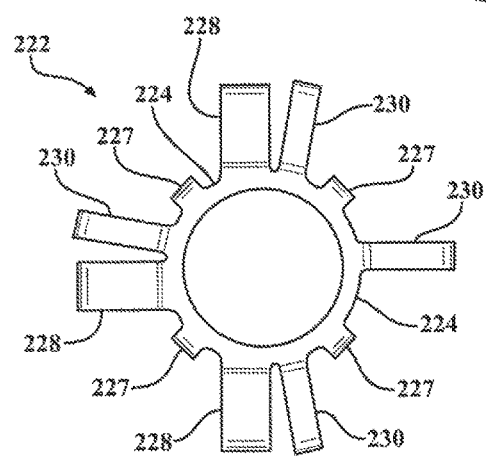
FIG. 17B is a top view of the leaf spring of FIG. 17A.
Figure 18:
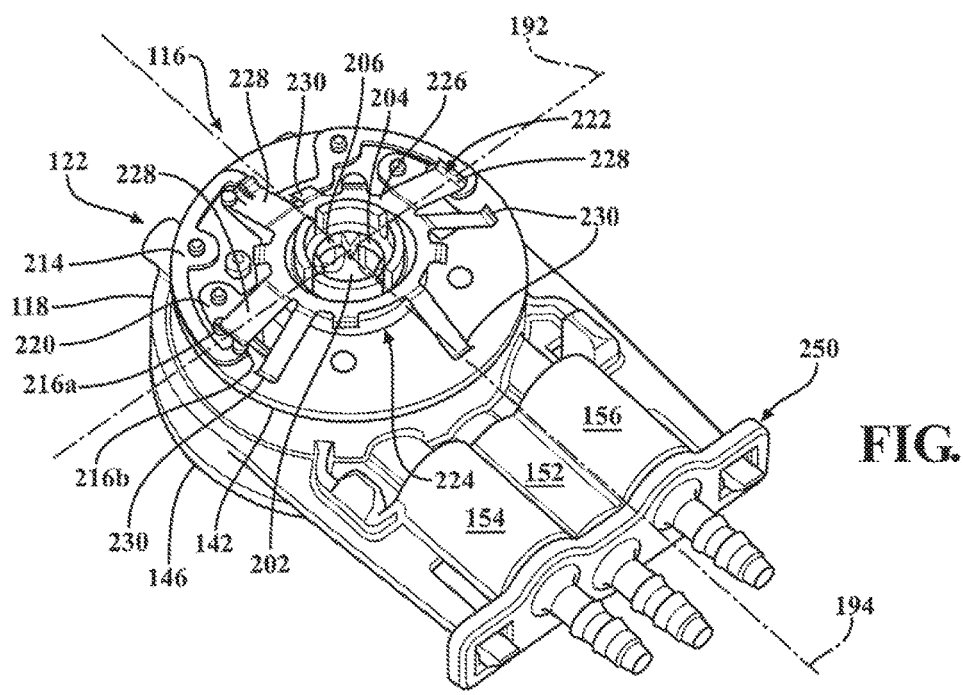
FIG. 18 is a perspective view of a portion of the valve of FIG. 3A, illustrating the top plate of body valve including an electrical switch for actuating the pump.
Figure 19:
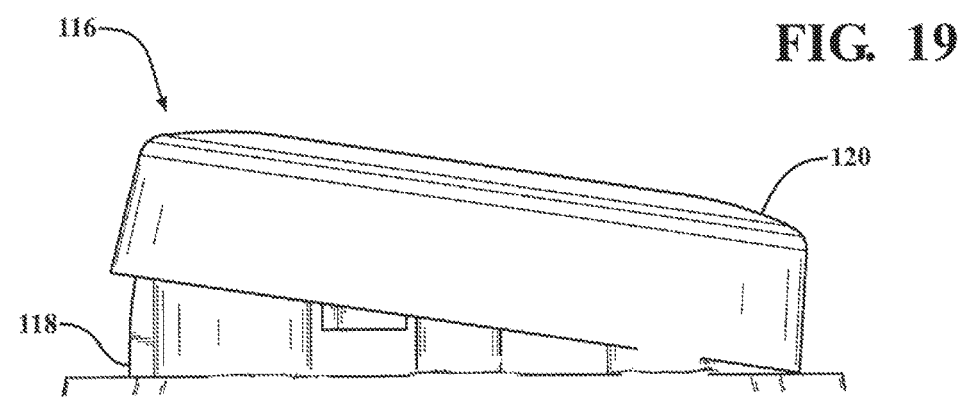
FIG. 19 is a top view of the valve of FIG. 3A, illustrating the actuator moved in a forward direction relative to the vehicle seat assembly, from a neutral position to a first operational position.
Figure 20:
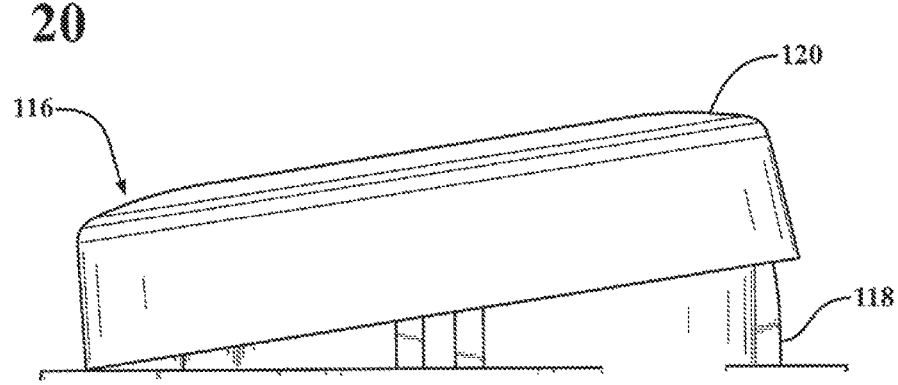
FIG. 20 is a top view of the valve of FIG. 3A, illustrating the actuator moved in a rearward direction relative to the vehicle seat assembly, from a neutral position to a second operational position.
Figure 21:
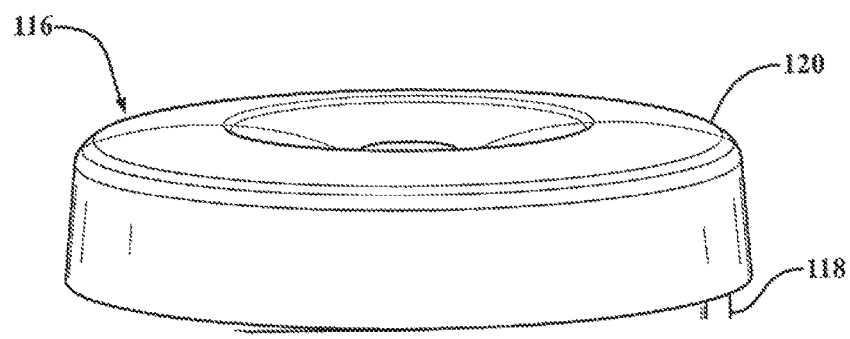
FIG. 21 is a top view of the valve of FIG. 3A, illustrating the actuator moved in an upward direction relative to the vehicle seat assembly, from a neutral position to a third operational position.
Figure 22:
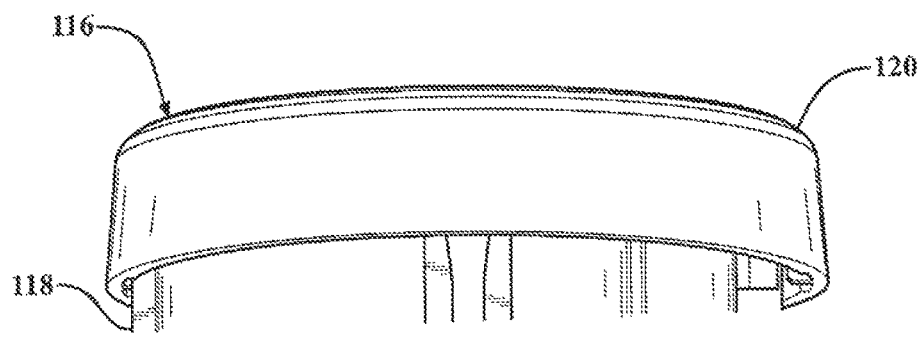
FIG. 22 is a top view of the valve of FIG. 3A, illustrating the actuator moved in a downward direction relative to the vehicle seat assembly, from a neutral position to a fourth operational position.

Referring generally to FIGS. 16 through 18, the actuator 120 is movably coupled to the center portion 150 of the body 118 between the neutral position spaced apart from the plungers and a plurality of operational positions to move one or more plungers and adjust the corresponding air cells. In this embodiment, the actuator in any one of the operational positions contacts and moves one of the plungers 164a, 164b corresponding with the upper air cell 108 and one of the plungers 180a, 180b corresponding with the lower air cell 110 to simultaneously adjust both of the upper and lower air cells 108, 110. It is contemplated that the actuator in an operational position can move more or fewer plungers to adjust more or fewer than two air cells at a time.

The actuator 120 can tilt relative to the body 118 about a first axis 192 between the neutral position and first and second operational positions, and the actuator can tilt about a second axis 194 between the neutral position and third and fourth operational positions, with the first axis 192 and the second axis 194 being perpendicular to one another. More specifically, as shown in FIG. 17A, the actuator 120 can include a housing 196 manipulated by a person's hand and a post 198, which extends from the housing 196 and terminates at an end 200. As shown in FIG. 18, the body 118 of the valve 116 can include an aperture 202 that slidably receives the post 198 to movably attach the actuator 120 to the body 118 and permit the actuator 120 to move between the neutral position and the first, second, third, and fourth operational positions. The aperture 202 defines a pair of guide slots 204, 206 bisecting one another, and the post 198 can slide through the slots 204, 206 to permit the actuator 120 to move between the neutral position when the post 198 is disposed at the intersection between the slots 204, 206, and first, second, third, and fourth operational positions when the post 198 is disposed at a corresponding one of the four ends of the two slots 204, 206. The body 118 can also include a concave surface 208 that slidably supports the end 200 of the post 198 when the actuator 120 moves between the neutral position and the four operational positions.

Figure 10:
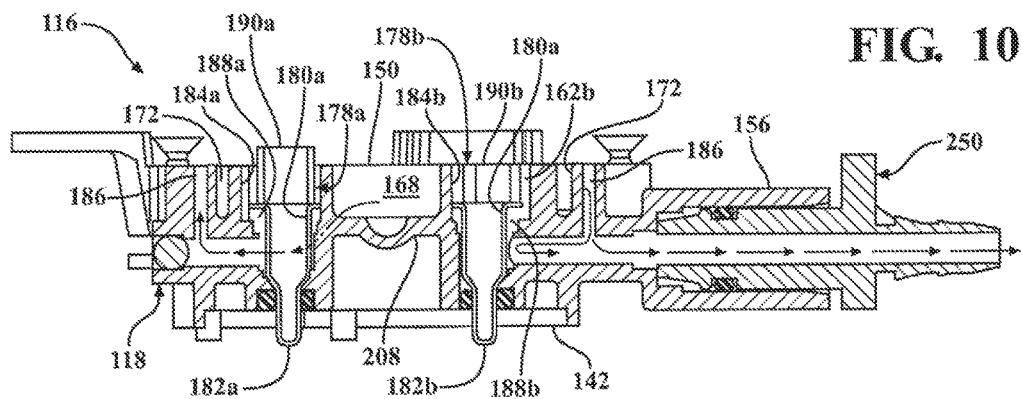
FIG. 10 is a cross-sectional view of the valve of FIG. 5, as taken along line 10-10, illustrating an inflate plunger being opened and a deflate plunger remaining closed to inflate the corresponding lower air cell.
Figure 11:
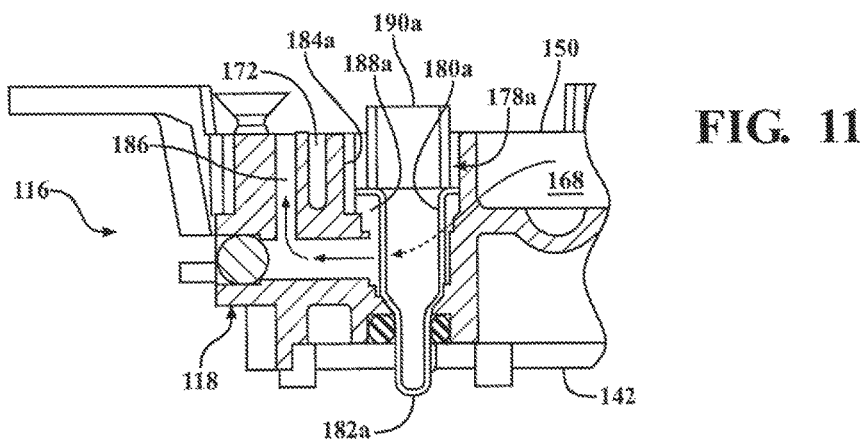
FIG. 11 is an enlarged view of a portion of the valve having the inflate plunger shown in FIG. 10.
Figure 12:
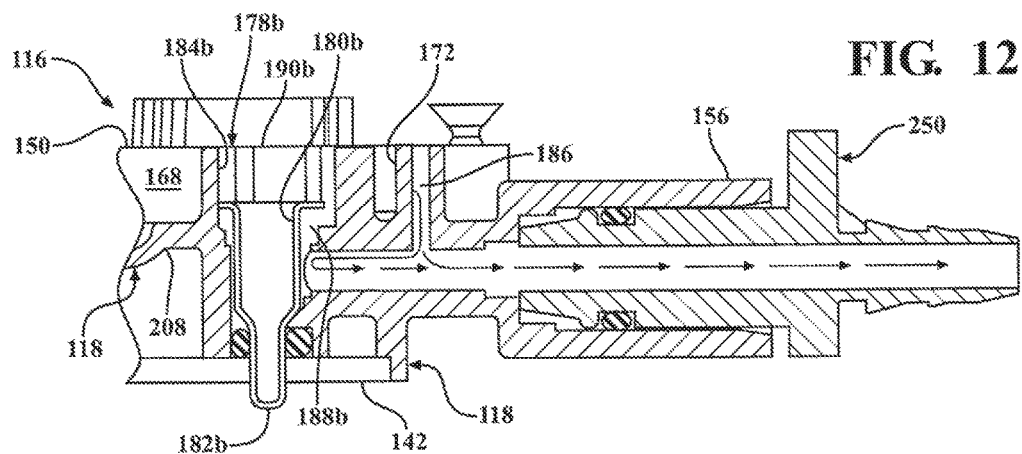
FIG. 12 is an enlarged view of a portion of the valve having the deflate plunger shown in FIG. 10.
Figure 23:
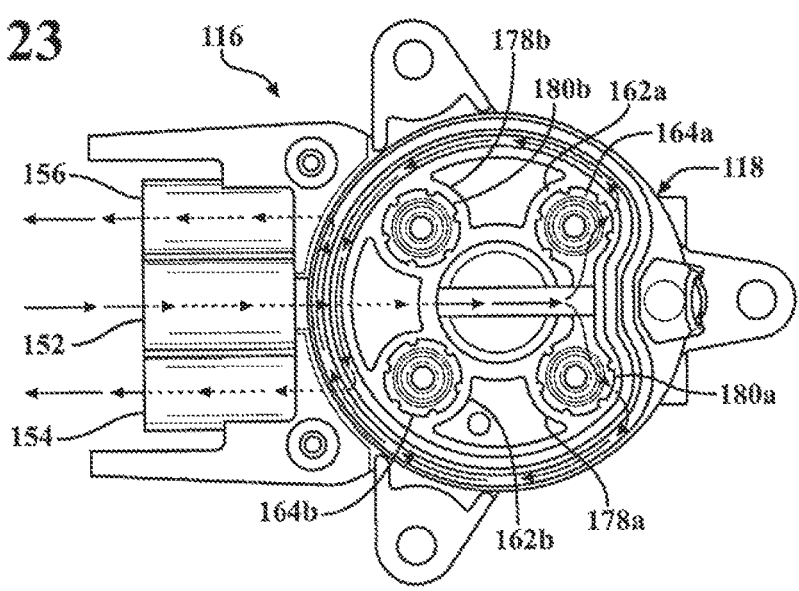
FIG. 23 is a side view of a portion of the valve of FIG. 3B, illustrating the valve having two inflate plungers moved to selectively open corresponding cavities to inflate both the upper and lower air cells.

Referring to FIGS. 6, 10, and 23, the actuator 120 can move to the first operational position to contact the tip 166a of the inflate plunger 164a and move the inflate plunger 164a to open the cavity 162a, such that the pump 112 fluidly communicates with the upper air cell 108 to inflate the upper air cell 108. The actuator in the first operational position also contacts the tip 182a of the inflate plunger 180a and moves the inflate plunger 180a to open the cavity 178a, such that the pump 112 fluidly communicates with the lower air cell 110 to inflate the lower air cell 110.

Figure 24:
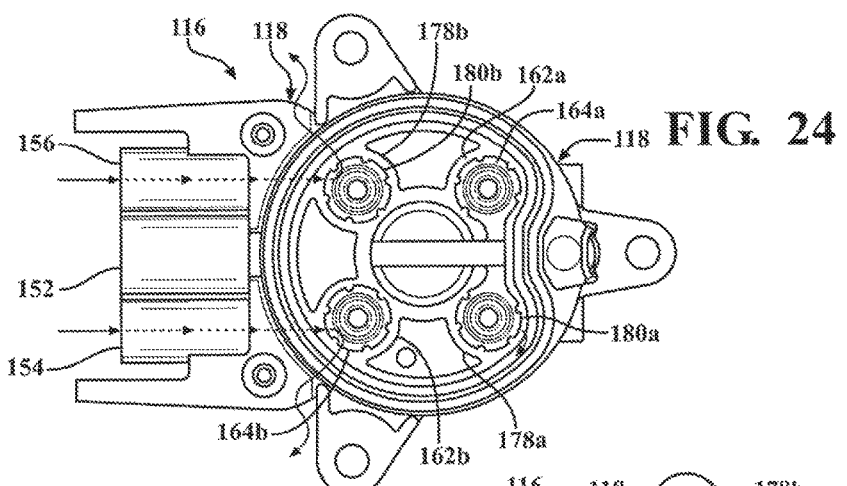
FIG. 24 is a side view of a portion of the valve of FIG. 3B, illustrating the valve having deflate plungers moved to selectively open corresponding cavities to deflate both the upper and lower air cells.

Referring to FIGS. 13, 14, and 24, the actuator 120 can move to the second operational position to contact the tip 166b of the deflate plunger 164b and move the deflate plunger 164b to open the cavity 162b, such that the upper air cell 108 fluidly communicates with the exhaust port 158 to deflate the upper air cell 108. The actuator in the second operational position also contacts the tip 182b of the deflate plunger 180b and moves the deflate plunger 180b to open the cavity 178b, such that the lower air cell 110 communicates with the exhaust port 160 to deflate the lower air cell 110.

Figure 25:
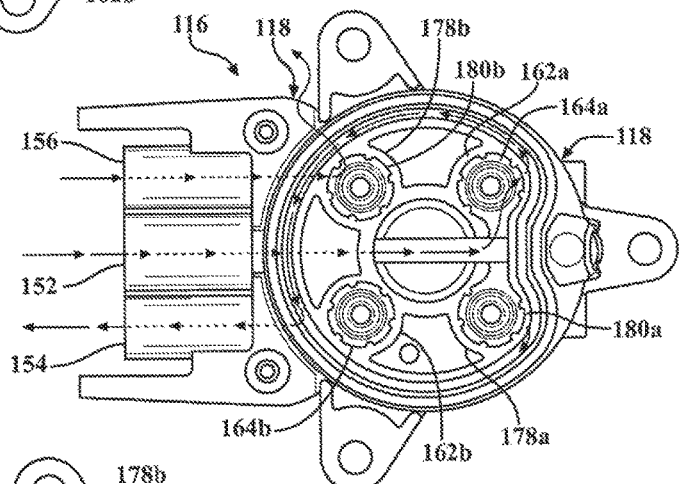
FIG. 25 is a side view of a portion of the valve of FIG. 3B, illustrating the valve having an inflate plunger moved to selectively open the corresponding cavity to inflate the upper air cell and a deflate plunger moved to selectively open the corresponding cavity to deflate the lower air cell.

Referring to FIGS. 6, 14, and 25, the actuator 120 can move to the third operational position to contact the tip 166a of the inflate plunger 164a and move the inflate plunger 164a to open the cavity 162a, such that the pump 112 fluidly communicates with the upper air cell 108 to inflate the upper air cell 108. The actuator in the third operational position also contacts the tip 182b of the deflate plunger 180b and moves the deflate plunger 180b to open the cavity 178b, such that the lower air cell 110 fluidly communicates with the atmosphere to deflate the lower air cell 110.

Figure 26:
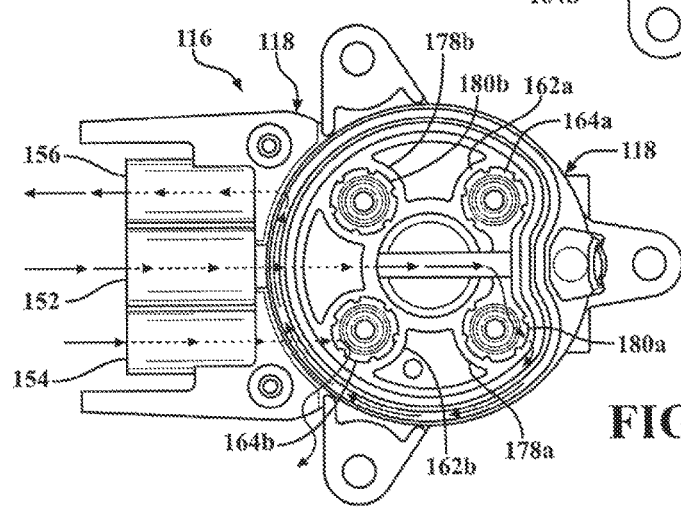
FIG. 26 is a side view of a portion of the valve of FIG. 3B, illustrating the valve having a deflate plunger moved to selectively open the corresponding cavity to deflate the upper air cell and an inflate plunger moved to selectively open the corresponding cavity to inflate the lower air cell.

Referring to FIGS. 10, 13, and 26, the actuator 120 can move to the fourth operational position to contact the tip 166b of the deflate plunger 164b and move the deflate plunger 164b to open the cavity 162b, such that the upper air cell 108 fluidly communicates with the exhaust port 158 to deflate the upper air cell 108. The actuator in the fourth operational position also contacts the tip 182a of the inflate plunger 180a and moves the inflate plunger 180a to open the cavity 178a, such that the pump 112 fluidly communicates with the lower air cell 110 to inflate the lower air cell 110.

Figure 27:
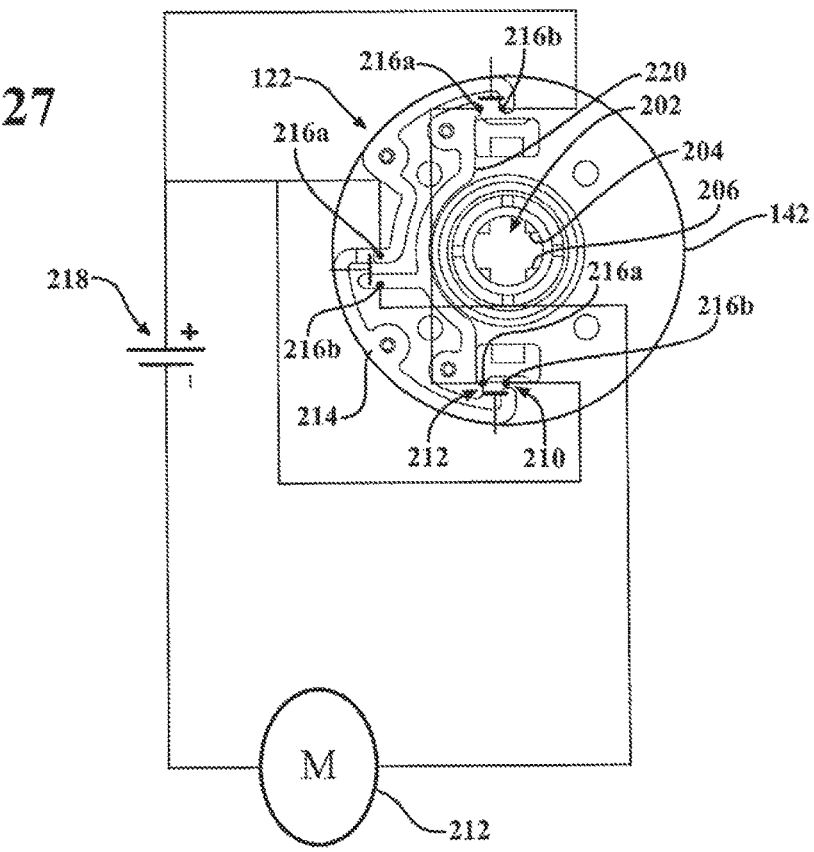
FIG. 27 is a circuit diagram of the lumbar support system of FIG. 2A, illustrating the lumbar support system having an electrical switch to selectively actuate the pump to inflate the upper and lower air cells.

Referring to FIG. 27, the electrical switch 122 is closed when the actuator is moved to any of the operational positions corresponding with the pump inflating one or more of the air cells 108, 110. In this embodiment, these operational positions include the first, third, and fourth operational positions of the actuator. The electrical switch 122 is a normally open switch 210 including a plurality of normally open electrical contacts 212 mounted to the body 118. In this example, the switch 210 includes a first contact path 214 heat staked to the top plate 142 and including a plurality of electrical contact pads 216a. The first contact path 214 is a positive leg of the switch 210 and electrically coupled to the electrical input 114, which in this form is a positive terminal of a battery 218. The switch 210 can further include a second contact path 220 electrically coupled to the pump 112 and heat staked to the top plate 142. The second contact path 220 can include a plurality of contact pads 216b spaced apart from corresponding contact pads 216a of the first contact path 214.

Referring back to FIGS. 17A, 17B, and 18, the electrical switch 122 can further include an electrical conductor 222 mounted to the actuator 120 and electrically coupling at least two of the normally open contacts 212 to one another to actuate the pump 112 when the actuator 120 is moved to any one of the first, third, or fourth operational positions. As best shown in FIG. 17B, the electrical switch 122 can include a leaf spring 224, which includes a ring 226 mounted to the actuator 120. In this embodiment, the leaf spring 224 includes a plurality of retention tabs 227 extending radially outward from the ring 226 and coupled to the actuator 120. The retention tabs 227 can be spaced apart from one another about the ring 226 and coupled to the actuator by an interference fit. However, it is contemplated that other embodiments of the electrical conductor can have any suitable fastener coupling the electrical conductor to the actuator, the body, or other portions of the valve.

The leaf spring 224 further includes one conductive arm 228 extending from the ring 226 for a corresponding pair of spaced apart contact pads 216a, 216b. Each conductive arm 228 electrically connects the corresponding pair of contact pads 216a, 216b to close the switch 210 and actuate the pump 112, when the actuator 120 is moved to the first, third, and fourth operational positions. When the actuator 120 is returned to the neutral position, each one of the conductive arms 228 is spaced apart from each corresponding pair of contact pads 216a, 216b, such that the switch is opened and the electrical input 114 is not electrically coupled to the pump 112.

The leaf spring 224 is a spring that moves the actuator to the neutral position (FIG. 3A) between the operational positions, such that the actuator 120 is spaced apart from each of the plungers 164a, 164b, 180a, 180b to permit each one of the springs 176a, 176b, 190a, 190b to move the plungers 164a, 164b, 180a, 180b in the corresponding the cavities 162a, 162b, 178a, 178b to close those cavities 162a, 162b, 178a, 178b. More specifically, the leaf spring 224 includes a plurality of resilient arms 230 extending from the ring 226. Each resilient arm 230 contacts the body 118 and elastically bends when a person moves the actuator 120 to one of the operational positions. When the person releases the actuator 120 from its operational position, the corresponding resilient arm 230 returns the actuator to its neutral position.

Figure 28:
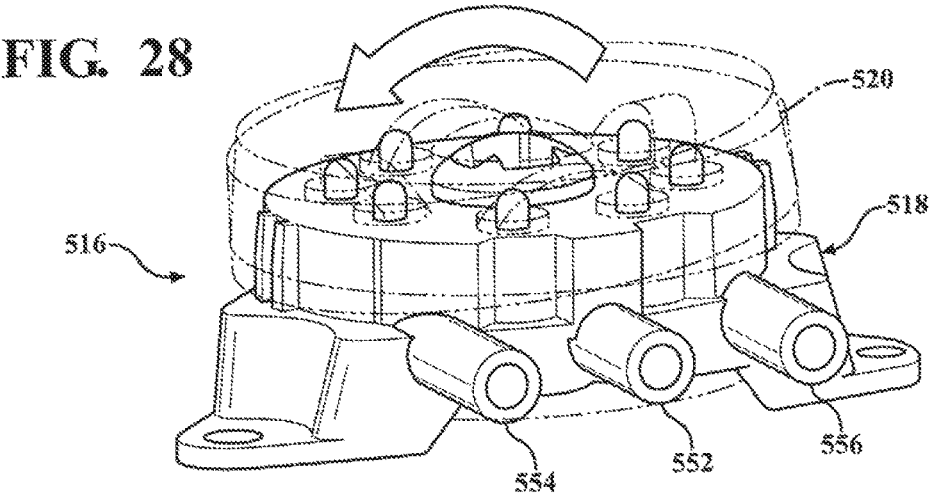
FIG. 28 is a side view of another embodiment of a valve for the lumbar support system of FIG. 2A, illustrating the valve having eight plungers and corresponding cavities.
Figure 29:
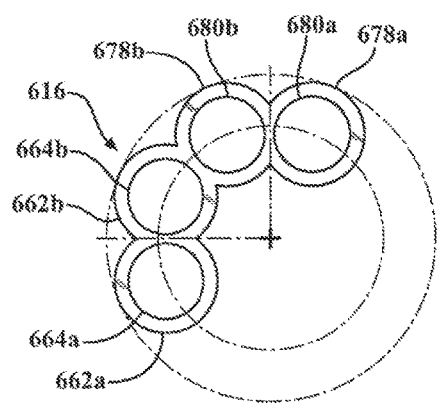
FIG. 29 is a schematic diagram of still another embodiment of a valve having another exemplary arrangement of plungers and cavities.
Figure 30:
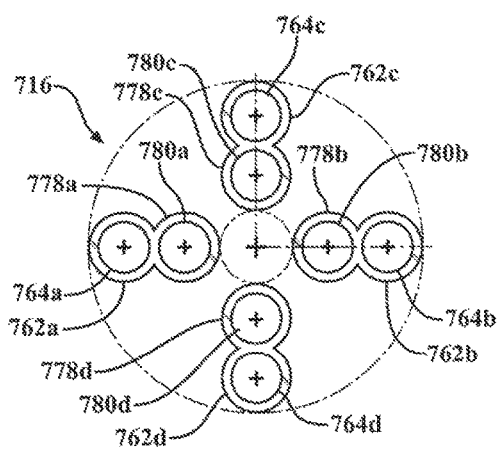
FIG. 30 is a schematic diagram of yet another embodiment of a valve having yet another exemplary arrangement of plungers and cavities.
Figure 31:
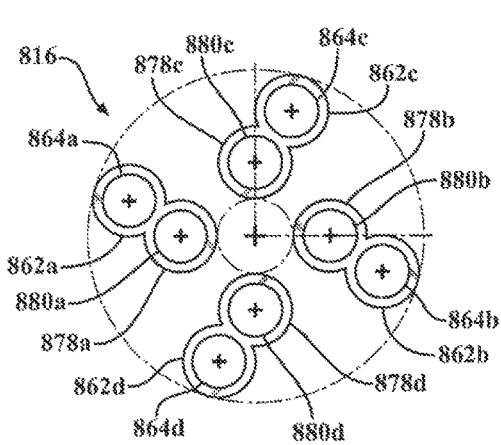
FIG. 31 is a schematic diagram of still another embodiment of a valve having still another exemplary arrangement of plungers and cavities.
Figure 32:
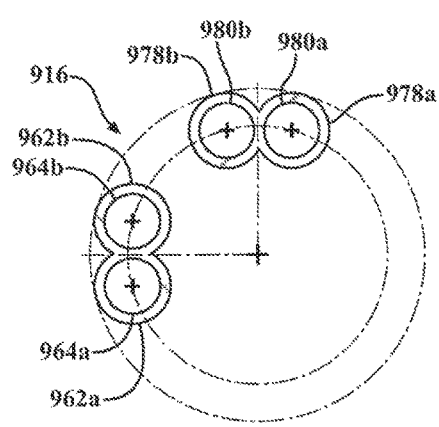
FIG. 32 is a schematic diagram of another embodiment of a valve having another exemplary arrangement of plungers and cavities.

It is contemplated that other embodiments of the valve can have any suitable number of plungers and corresponding cavities arranged in any suitable pattern to fluidly communicate the air cell ports with the supply port and exhaust ports. As shown in FIG. 28, another embodiment of a valve 516 is similar to the valve of FIGS. 23 through 26 and include the same or similar components identified by the same numbers increased by 400. However, while the valve 116 of FIGS. 23 through 26 includes one inflate plunger and one deflate plunger corresponding with each air cell, the valve 516 includes two inflate plungers and two deflate plungers corresponding with each air cell. It is contemplated that the valve can have any number of plungers corresponding with each air cell. FIGS. 29 through 32 illustrate other embodiments of the valve 616, 716, 816, 916 including plungers and corresponding cavities arranged in any suitable pattern. FIGS. 30 and 31 illustrate the corresponding valves 716, 816 having at least one of the cavities corresponding with the upper air cell and the lower air cell disposed along one of the two axes about which the actuator tilts.

Figure 33:
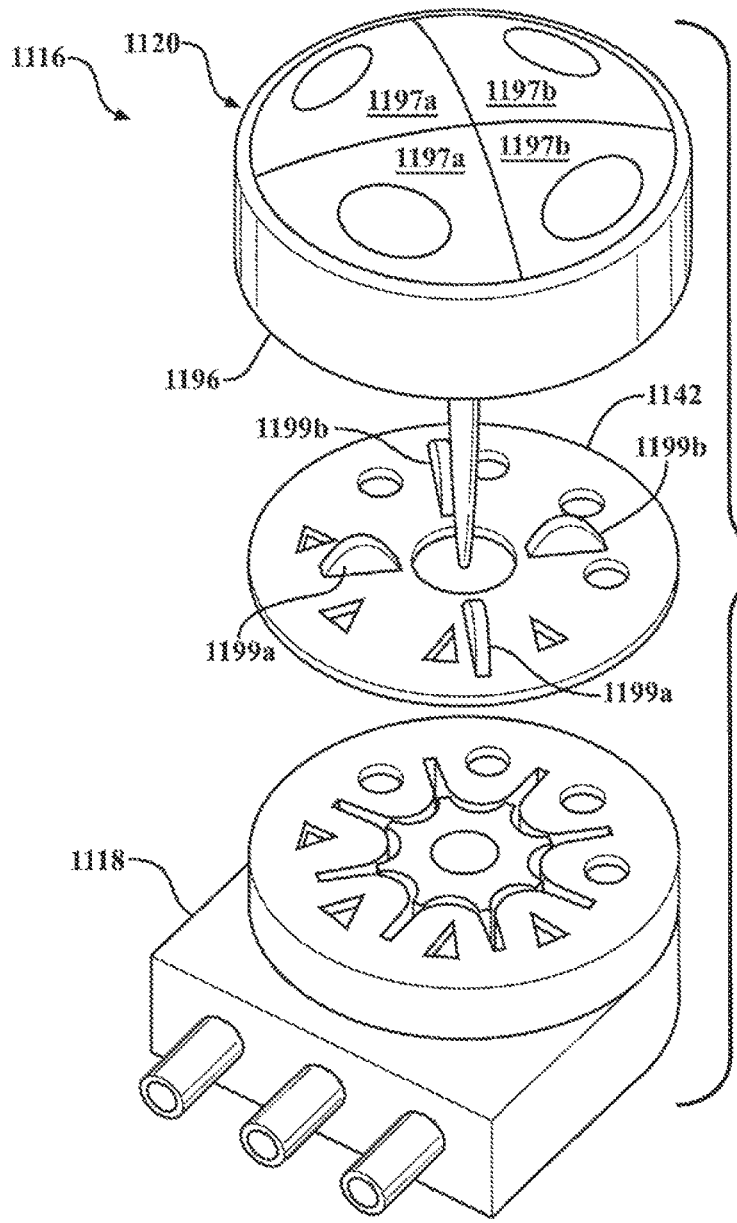
FIG. 33 is an exploded view of another embodiment of a valve for the lumbar support system of FIG. 2A.
Figure 34:
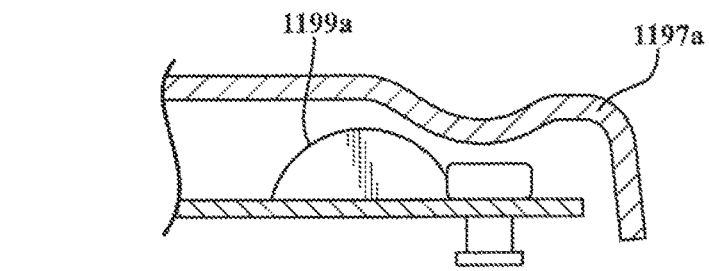
FIG. 34 is a cross-sectional view of a portion of the valve of FIG. 33.
Figure 35:
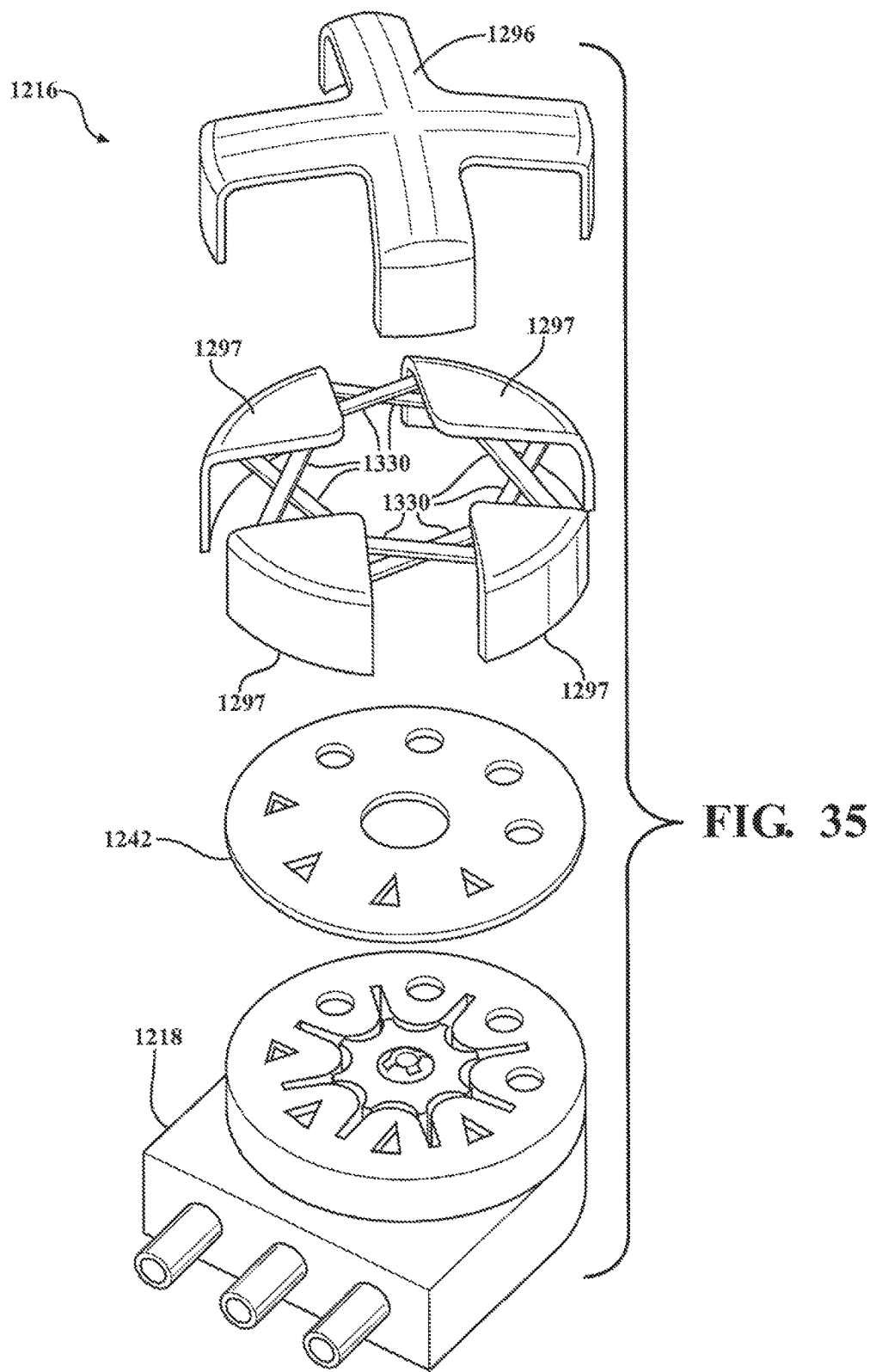
FIG. 35 is an exploded view of still another embodiment of a valve for the lumbar support system of FIG. 2A having an actuator.
Figure 36:
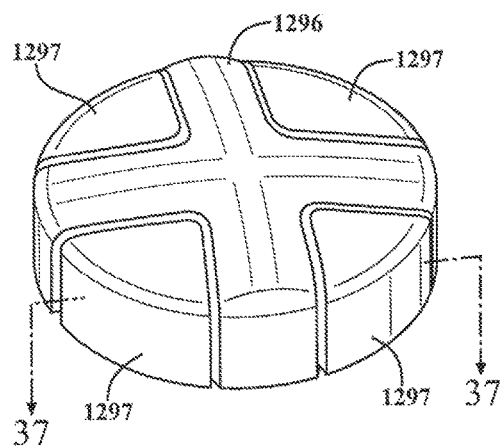
FIG. 36 is a perspective view of the actuator of FIG. 35.
Figure 37:
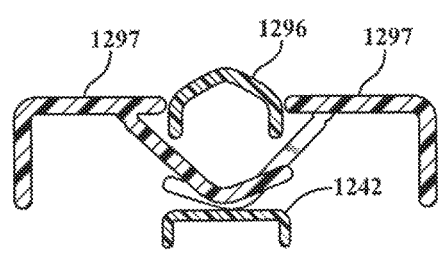
FIG. 37 is a cross-sectional view of the actuator of FIG. 36, illustrating the actuator having a plurality of control buttons in a neutral position.
Figure 38:
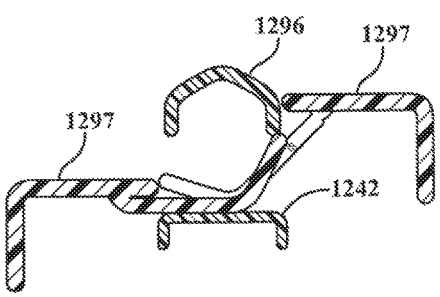
FIG. 38 is a cross-sectional view of the actuator of FIG. 36, illustrating the one of the control buttons moved to an operational position to inflate or deflate one or more air cells.

Referring to FIGS. 33 and 34, another embodiment of the valve 1116 is similar to the valve 116 of FIGS. 23 through 26 and includes the same parts identified by the same reference numbers increased by 1000. However, while the valve 116 of FIGS. 23 through 26 includes the actuator 120 having a single piece housing 196 contacting the tips of plungers and moving those plungers, the valve 1116 includes an actuator 1120, which includes a mounting bracket 1196 and a pair of individual control buttons 1197a, 1197b for each air cell and movably coupled to the mounting bracket 1196. Each of the control buttons 1197a, 1197b includes a spring 1199a, 1199b returning the control buttons 1197a, 1197b to the neutral position.

Referring to FIGS. 35 through 38, another embodiment of a valve 1216 is similar to the valve 116 of FIGS. 23 through 26 and includes the same parts identified by the same reference numbers increased by 1100. However, the valve 1216 includes a central mounting bracket 1296 and a plurality of separate control buttons 1297 movably coupled to the mounting bracket 1296. Each control button 1297 includes a resilient arm 1330 spaced apart from the top plate 1242 when the button 1297 is in the neutral position (FIG. 37) and elastically deformed when the button 1297 is moved to an operational position (FIG. 38) to move a corresponding plunger and open the corresponding cavity. When a person releases the button 1297 from its neutral position, the resilient arm 1330 returns the button 1297 to its neutral position.

Figure 39:
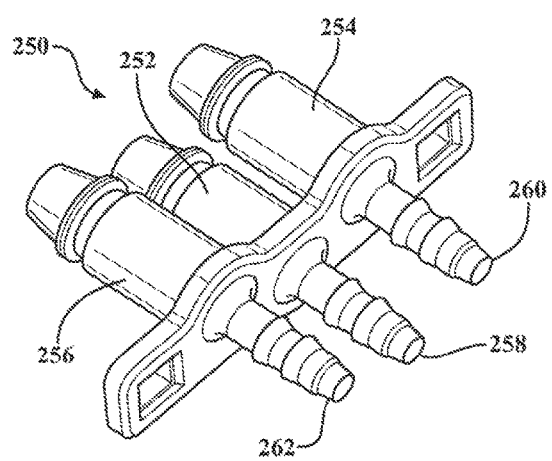
FIG. 39 is a perspective view of a quick connect bayonet for fluidly connecting the valve of FIG. 2A to multiple tubes communicating with the air cells and the pump.

FIG. 39 illustrates one exemplary connector 250 with multiple male plugs 252, 254, 256 received within a corresponding one of the supply port 152, the upper air cell port 154, and the lower air cell port 156. The connector 250 can have a corresponding number of male plugs 258, 260, 262 received within individual tubes to fluidly communicate with those tubes. The tubes can fluidly communicate with a corresponding one of the pump 112, the upper air cell 108, and the lower air cell 110.

It is contemplated that the valve can have any number of plungers that are moved by an actuator to selectively inflate and/or deflate any combination of air cells mounted to a vehicle seat assembly. In particular, while the valve of the lumbar support system as described above simultaneously inflates or deflates two air cells mounted in the seat back of the vehicle seat assembly, it is contemplated that other embodiments of the valve can be used to simultaneously inflate or deflate more or fewer than two air cells. Also, the air cells can be mounted to any suitable portion of the vehicle seat assembly to, for example, provide various configurations of air cells for supporting various passengers.

The present inventions have been described herein in an illustrative manner, and it is to be understood that the terminology which has been used is intended to be in the nature of words of description rather than of limitation. Many modifications and variations of the present inventions are possible in light of the above teachings. The inventions may be practiced otherwise than as specifically described within the scope of the appended claims.

What is claimed is:

1. A vehicle seat assembly comprising:
   a seat back;
   a seat bottom coupled to said seat back; and
   a lumbar support system coupled to at least one of said seat back and said seat bottom, said lumbar support system having:
      at least one air cell mounted to at least one of said seat back and said seat bottom;
      a pump fluidly connected to said at least one air cell to selectively inflate said at least one air cell, and said pump having an electrical input; and
      a valve fluidly connected between said pump and said at least one air cell with said valve having:
         a body defining a pair of cavities corresponding with each one of said at least one air cell;
         an inflate plunger movable in one of said cavities to selectively open said cavity;

a deflate plunger movable in the other of said cavities to selectively open the other of said cavities;

an actuator movably coupled to said body between a first operational position to move said inflate plunger to open said cavity such that said pump fluidly communicates with said at least one air cell to inflate said at least one air cell, and a second operational position to move said deflate plunger to open the other of said cavities such that said at least one air cell fluidly communicates with the atmosphere to deflate said at least one air cell; and an electrical switch coupled to said electrical input of said pump and closed when said actuator is moved to any one of said first and second operational positions.

2. The vehicle seat assembly of claim 1, wherein said electrical switch comprises a normally open switch including a plurality of normally open contacts mounted to said body and electrically coupled to said electrical input of said pump, and said normally open switch further includes an electrical conductor mounted to said actuator and electrically coupling at least two of said normally open contacts to one another to actuate said pump when said actuator is moved to said first operational position.

3. The vehicle seat assembly of claim 1, wherein said seatback includes a lumbar region, and said at least one air cell is coupled to said lumbar region of said seatback.

4. The vehicle seat assembly of claim 3, wherein said lumbar region includes a lower portion and an upper portion above said lower portion, and said at least one air cell includes a lower air cell coupled to said lower portion of said lumbar region and an upper air cell coupled to said upper portion of said lumbar region and above said lower air cell.

5. A lumbar support system for a vehicle seat assembly, the lumbar support system comprising:

at least one air cell adapted to be mounted to the vehicle seat assembly;

a pump fluidly connected to said at least one air cell to selectively inflate said at least one air cell, and said pump having an electrical input; and a valve fluidly connected between said pump and said at least one air cell with said valve having:

a body defining a pair of cavities corresponding with each one of said at least one air cell;

an inflate plunger movable in one of said cavities to selectively open said cavity;

a deflate plunger movable in the other of said cavities to selectively open the other of said cavities;

an actuator movably coupled to said body between a first operational position to move said inflate plunger to open said cavity such that said pump fluidly communicates with said at least one air cell to inflate said at least one air cell, and a second operational position to move said deflate plunger to open the other of said cavities such that said at least one air cell fluidly communicates with the atmosphere to deflate said at least one air cell; and an electrical switch electrically coupled to said electrical input of said pump and closed when said actuator is moved to any one of said first and second operational positions.

6. The lumbar support system of claim 5, wherein said electrical switch comprises a normally open switch being closed when said actuator is in any one of said first and second operational positions, with said normally open switch being opened when said actuator is in a neutral position between said first and second operational positions.

7. The lumbar support system of claim 6, wherein said normally open switch includes a plurality of normally open contacts mounted to said body and electrically coupled to said electrical input of said pump, and said normally open switch further includes an electrical conductor mounted to said actuator and electrically coupling at least two of said normally open contacts to one another to actuate said pump when said actuator is moved to said first operational position.

8. The lumbar support system of claim 5, wherein said at least one air cell includes an upper air cell and a lower air cell, and said actuator moves between a neutral position and one of said first operational position, said second operational position, a third operational position, and a fourth operational position to adjust both of said upper air cell and said lower air cell.

9. The lumbar support system of claim 8, wherein said actuator in said first operational position moves said inflate plungers corresponding with said upper air cell and said lower air cell to open said corresponding cavities to inflate said upper air cell and said lower cell.

10. The lumbar support system of claim 8, wherein said actuator in said second operational position moves said deflate plungers corresponding with said upper air cell and said lower air cell to open said corresponding cavities to deflate said upper air cell and said lower air cell.

11. The lumbar support system of claim 8, wherein said actuator in said third operational position moves said inflate plunger corresponding with said upper air cell to open said corresponding cavity to inflate said upper air cell, and said actuator in said third position moves said deflate plunger corresponding with said lower air cell to open said corresponding cavity to deflate said lower air cell.

12. The lumbar support system of claim 8, wherein said actuator in said fourth operational position moves said deflate plunger corresponding with said upper air cell to open said corresponding cavity to deflate said upper air cell, and said actuator in said fourth operational position moves said inflate plunger corresponding with said lower air cell to open said corresponding cavity to inflate said lower air cell.

13. The lumbar support system of claim 8, wherein said body has a center portion, with said pair of cavities corresponding with said upper air cell being on opposing sides of said center portion, and said pair of cavities corresponding with said lower air cell being on opposing sides of said center portion and angularly offset about said center portion from said pair of cavities corresponding with said upper air cell.

14. The lumbar support system of claim 13, wherein each one of said cavities corresponding with said upper air cell and said lower air cell are angularly offset from one another about said center region by 90 degrees.

15. The lumbar support system of claim 13, wherein said actuator is movably coupled to said center portion to tilt along two axes, said actuator tilting about one of said two axes to move between said neutral position and said first and second operational positions, and said actuator tilting about the other of said two axes between said neutral position and said third and fourth operational positions, such that said actuator opens one of said cavities corresponding with said upper air cell and one of said cavities corresponding with said lower air cell when said actuator is in one of said first, second, third, and fourth operational positions.

16. The lumbar support system of claim 15, wherein said cavities corresponding with said upper air cell and said lower air cell being spaced apart from each of said two axes.

17. The lumbar support system of claim 15, wherein said actuator is movably coupled to said center portion to tilt along said two axes that are perpendicular to one another.

18. The lumbar support system of claim 5, wherein said body includes:
- a supply port fluidly connected to said pump to receive a flow of air from said pump when said pump is actuated by said electrical input; and
- at least one cell port fluidly connected to each of said at least one air cell to selectively inflate each of said at least one air cell.

19. The lumbar support system of claim 5, further comprising a spring moving said actuator to a neutral position between said first and second operational positions.

20. The support system of claim 19, wherein each one of said cavities is closed when said actuator is in said neutral position.

\* \* \* \* \*